(12) United States Patent
Takiguchi et al.

(10) Patent No.: US 12,110,409 B2
(45) Date of Patent: Oct. 8, 2024

(54) PAINTED METAL PLATE AND METHOD FOR PRODUCING SAME

(71) Applicant: Nippon Steel Corporation, Tokyo (JP)

(72) Inventors: Keiko Takiguchi, Tokyo (JP); Masaki Satou, Tokyo (JP); Seiju Suzuki, Tokyo (JP); Shuichi Sugita, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 552 days.

(21) Appl. No.: 17/282,019

(22) PCT Filed: Apr. 10, 2019

(86) PCT No.: PCT/JP2019/015632
§ 371 (c)(1),
(2) Date: Apr. 1, 2021

(87) PCT Pub. No.: WO2020/070913
PCT Pub. Date: Apr. 9, 2020

(65) Prior Publication Data
US 2021/0340400 A1     Nov. 4, 2021

(30) Foreign Application Priority Data

Oct. 3, 2018   (JP) .................................. 2018-188120

(51) Int. Cl.
*C09D 127/16*     (2006.01)
*B05D 3/08*       (2006.01)
(Continued)

(52) U.S. Cl.
CPC ............. *C09D 127/16* (2013.01); *B05D 3/08* (2013.01); *B05D 7/14* (2013.01); *C23C 2/26* (2013.01); *C23C 26/00* (2013.01)

(58) Field of Classification Search
None
See application file for complete search history.

(56) References Cited

U.S. PATENT DOCUMENTS

| | | | |
|---|---|---|---|
| 5,635,572 A | 6/1997 | Ohnishi et al. | |
| 2020/0024476 A1 | 1/2020 | Satou et al. | |
| 2020/0087537 A1 | 3/2020 | Satou et al. | |

FOREIGN PATENT DOCUMENTS

| | | |
|---|---|---|
| JP | 05-059330 | 3/1993 |
| JP | 08-012921 | 1/1996 |

(Continued)

OTHER PUBLICATIONS

Guillou et al., "Oxidized barrier thin film from plasma grown polysiloxane coating over austenitic stainless steel", Mar. 29, 2008, Surface & Coatings Technology, vol. 202, p. 4233-4241. (Year: 2008).*

*Primary Examiner* — Kim S. Horger

(57) ABSTRACT

The present invention addresses the problem of providing a painted metal plate having rain-streak-stain resistance and a good appearance, and a method for producing the same. To solve this problem, the method for producing a painted metal plate includes a step for forming a coating by applying a paint containing a silicone resin and a fluorine-containing resin to the surface of a metal plate and curing the paint, and a step for performing flame treatment on the coating. The silicone resin contains 5 to 50 mol % of a silanol group with respect to the total molar mass of Si atoms.

7 Claims, 3 Drawing Sheets

(51) Int. Cl.
*B05D 7/14* (2006.01)
*C23C 2/26* (2006.01)
*C23C 26/00* (2006.01)

(56) References Cited

FOREIGN PATENT DOCUMENTS

| | | |
|---|---|---|
| JP | 10-128232 | 5/1998 |
| JP | 2000-061391 | 2/2000 |
| JP | 2002-307606 | 10/2002 |
| JP | 2006-102671 | 4/2006 |
| WO | WO 94/06870 | 3/1994 |
| WO | WO 2018/179453 | 10/2018 |
| WO | WO 2018/179466 | 10/2018 |
| WO | WO 2018/180831 | 10/2018 |

\* cited by examiner

PAINTED METAL PLATE AND METHOD FOR PRODUCING SAME

TECHNICAL FIELD

The present invention relates to a coated metal sheet and a production method therefor.

BACKGROUND ART

Coated metal sheets are frequently used in outdoor constructions, civil engineering structures and the like. In the case where long-term durability is required for coated metal sheets, coated metal sheets are often used that use fluorine-containing resin-based coating materials with excellent weather resistance and mechanical properties as the coating material for the coating film disposed on the surface side. Such coated metal sheets suffer stains due to adherence of carbon-based pollutional material (hereinafter also referred to as "hydrophobic carbon") contained in exhaust from automobiles, industrial smoke and the like. Among stains, stains adhering along rain streaks (hereinafter also referred to as "rain-streak stain") are particularly noticeable. Even on coated metal sheets onto which fluorine-containing resin-based coating materials have been baked, it is inevitable that rain-streak stains noticeably appear within a relatively short time. Therefore, there is a need to provide coated metal sheets on which rain-streak stains are not easily generated.

In recent years, it has been proposed to prevent a rain-streak stain by employing a coating film having a water contact angle of 60° or less, namely a hydrophilic coating film. On the surface of a hydrophilic coating film having a low water contact angle, it is believed that hydrophobic carbon is more likely to leave the surface with rainwater and thus washed away. As one example of the approach for hydrophilizing the surface of a coated metal sheet, methods have been proposed, in which tetraalkoxysilane or a condensate thereof (hereinafter also referred to as an "organosilicate") is contained in the coating material (PTLS 1 to 3). Another method has also been proposed, in which a coating material containing a vinyl group-containing polysiloxane resin or the like is applied to a metal sheet and the coating film is subjected to a corona discharge treatment (PTL 4). Furthermore, a method has also been proposed, in which a coating material containing a fluorine-containing resin is applied to a metal sheet and the coating film is subjected to a corona discharge treatment at 200 W/m$^2$/min or more (PTL 5). Furthermore, a method has also been proposed in which a coating material containing organosilicate or the like is applied to a metal sheet and the coating film is subjected to a flame treatment, plasma treatment or corona discharge treatment (PTL 6).

CITATION LIST

Patent Literature

PTL1
WO1994/6870
PTL2
Japanese Patent Application Laid-Open No. H08-12921
PTL3
Japanese Patent Application Laid-Open No. H10-128232
PTL 4
Japanese Patent Application Laid-Open No. H05-59330
PTL 5
Japanese Patent Application Laid-Open No. 2000-61391
PTL 6
Japanese Patent Application Laid-Open No. 2006-102671

SUMMARY OF INVENTION

Technical Problem

The coating materials described in the above PTLS 1 to 3 contain various resins and organosilicates. When such coating materials are applied to the surface of the metal sheet, organosilicates move to the surface side of the film. Then, when curing the film, organosilicates react with moisture or the like in the air to produce silanol groups or siloxane bonds on the surface of the coating film. As a result of this, it is believed that the surface of the coating film is hydrophilized and rain-streak stains are suppressed.

However, it has been difficult for any of the organosilicates to sufficiently suppress the occurrence of rain-streak stains on coated metal sheets obtained from coating materials after long-term storage, and the effectiveness of rain-streak stain prevention properties has been unstable. In addition, as mentioned above, in coating materials containing cured products of organosilicates, the hardness of the surface has been unlikely to be enhanced sufficiently.

Meanwhile, it has been difficult for techniques described in the above-mentioned PTLS 4 to 6 to sufficiently prevent rain-streak stains. For example, in the technique described in PTL 4, after applying a coating material containing a polysiloxane resin to the surface of a metal sheet, a corona discharge treatment is carried out. However, it has been difficult to uniformly hydrophilize the surface of the coating film only by carrying out the corona discharge treatment on the coating film of that coating material. When a coating film containing a polysiloxane resin is subjected to a corona discharge treatment, hydrophilic areas and hydrophobic areas are formed on the surface of the coating film. Then, hydrophobic carbon adheres strongly to hydrophobic areas. On the other hand, in hydrophilic areas, hydrophobic carbon leaves the surface with rainwater. After that, the hydrophobic carbon leaving the surface is attracted to hydrophobic carbon adhering to hydrophobic areas, and hydrophobic carbon is gradually deposited around hydrophobic areas as base points. Therefore, it has been difficult to obtain a coated metal sheet having high rain-streak stain resistance even through the technique described in PTL 4.

In addition, in PTL 5, a corona discharge treatment is carried out on the surface of a coating film of a coating material containing a fluorine-containing resin and the like, but in this case as well, hydrophobic areas and hydrophilic areas are formed, and thus, it has been difficult to uniformly hydrophilize the surface of the coating film.

In addition, in the case of the coating materials containing organosilicates described in PTLS 1 to 3 and PTL 6, upon heating and drying films composed of the coating materials, organosilicates tend to be evaporated along with solvents and adhere to the wall surface of a heating apparatus, thereby producing silica. Then, when that silica comes in contact with the films during heating or when that silica comes off from the heating apparatus and adheres to the surface of the films, poor appearance of coated metal sheets to be obtained tends to occur.

The present invention has been completed in view of the above circumstances. That is, an object of the present invention is to provide a method for producing a coated metal sheet that rarely fouls a heating apparatus and is capable of readily forming a coating film having high rain-streak stain resistance. Also, another object of the present invention is to provide a coated metal sheet having high rain-streak stain resistance and satisfactory appearance.

Solution to Problem

A first aspect of the present invention relates to the following method for producing a coated metal sheet.

[1] A method for producing a coated metal sheet, comprising: forming a coating film on a surface of a metal sheet by applying and curing a coating material containing a silicone resin and a fluorine-containing resin; and subjecting the coating film to a flame treatment, wherein the silicone resin contains silanol groups in an amount of 5 to 50 mol % relative to a total number of moles of Si atoms.

[2] The method for producing a coated metal sheet according to [1], wherein the silicone resin contains Si atoms derived from trialkoxysilane in an amount of 50 to 100 mol % relative to the total number of moles of Si atoms.

[3] The method for producing a coated metal sheet according to [1] or [2], wherein a proportion of a number of moles of aryl groups directly bonded to Si atoms based on a number of moles of alkyl groups directly bonded to Si atoms is 20 to 80% in the silicone resin.

A second aspect of the present invention relates to the following coated metal sheet.

[4] A coated metal sheet, comprising: a metal sheet; and a fluorinated coating film formed on the metal sheet, wherein the coating film contains a cured product of a silicone resin, and a fluorine-containing resin; when a surface of the coating film is analyzed with X-ray electron spectroscopy using an AlKα ray as an X-ray source, $Si_a$ and x satisfy the following expressions respectively, wherein $Si_a$ is a proportion of Si atoms based on a total amount of Si atoms, F atoms, C atoms, and O atoms, and x is a ratio of an amount of O atoms to an amount of C atoms:

$Si_a \geq 8$ atm %

$x \geq 0.8$; and when a C1s peak top in an X-ray photoelectron spectroscopic spectrum obtained through the analysis with X-ray electron spectroscopy is corrected to be 285 eV and a $Si_{2p}$ spectrum is separated into a peak corresponding to 103.5 eV and a peak corresponding to 102.7 eV, y satisfies the following expression, in which y is a ratio of a peak area of 103.5 eV to a peak area of the entire $Si_2$, spectrum:

$y \geq 0.6$.

[5] The coated metal sheet according to [4], wherein a methylene iodide sliding angle on the surface of the coating film is 15° or more and 50° or less.

[6] The coated metal sheet according to [4] or [5], wherein the cured product of a silicone resin comprises a structure derived from methyltrialkoxysilane or phenyltrialkoxysilane.

[7] The coated metal sheet according to any one of [4] to [6], wherein the metal sheet is a zinc-based plated steel sheet.

Advantageous Effects of Invention

The coated metal sheet of the present invention has high rain-streak stain resistance, and has satisfactory coating appearance. In addition, according to the production method of the present invention, it is further possible to produce a coated metal sheet having high rain-streak stain resistance and having satisfactory coating appearance without fouling a heating apparatus.

DESCRIPTION OF EMBODIMENTS

Figure 1A:
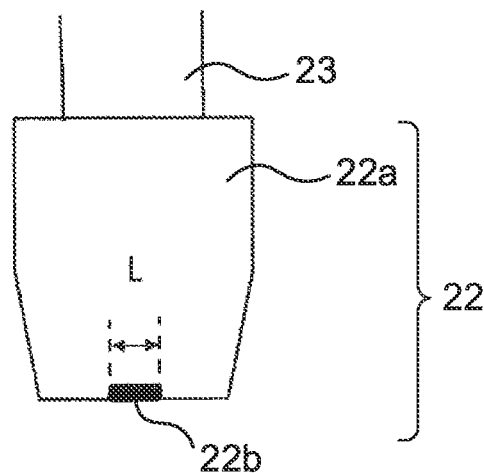
FIG. 1A is a side view of a burner head of a burner for flame treatment.

1. Method for Producing Coated Metal Sheet A method for producing a coated metal sheet according to the present invention includes forming a coating film on the surface of a metal sheet by applying and curing a silicone resin-containing coating material (hereinafter also referred to as "coating film formation") and subjecting the coating film to a flame treatment (hereinafter also referred to as "flame treatment").

As mentioned above, it has been conventionally attempted to prevent rain-streak stains that occur on a coated metal sheet by applying a coating material containing organosilicate or the like on the surface of a metal sheet. When applied to the surface of the metal sheet, organosilicate moves to the surface side. It is believed that these organosilicates are then hydrolyzed to produce silanol groups or siloxane bonds, thereby expressing rain-streak stain resistance. However, organosilicates tend to react with moisture in the coating materials, and thus when coating materials are stored for a long period of time, the hydrophilicity of the coating films cannot be sufficiently enhanced, and it has been difficult to obtain high rain-streak stain resistance as coated metal sheets. Furthermore, upon heating and drying films composed of the coating materials, organosilicates tend to be evaporated along with solvents and adhere to the wall surface of a heating apparatus, thereby producing silica. Then, there has been a problem in that when that silica comes in contact with the film during curing or when silica coming off from the heating apparatus adheres to the film, the appearance of a coated metal sheet to be obtained tends to be poor.

Meanwhile, it has also been examined to subjecting a coating film of a coating material containing organosilicate or the like to a corona treatment, but it has been difficult to uniformly hydrophilize the surface of the coating film with the corona treatment.

In contrast, in the method for producing a coated metal sheet according to the present invention, formation of a coating film by applying a coating material containing a particular silicone resin (containing silanol groups in an amount of 5 to 50 mol % relative to the total molar amount of Si atoms) and a fluorine-containing resin; and a flame treatment of the coating film are carried out. Here, the "silicone resin" in the present specification refers to a compound in which alkoxysilane is partially hydrolyzed and condensed. This compound mainly has a three dimensional crosslinked structure but does not reach the state of gel, and is a polymer that is soluble in an organic solvent. The three dimensional crosslinked structure that the silicone resin includes is not particularly limited, and for example, it may be any of cage-shaped, ladder-shaped or random shaped.

Note that, in the present specification, the silicone resin does not include tetraalkoxysilane or a condensate formed by hydrolyzing and condensing tetraalkoxysilane only (organosilicate).

Since the silicone resin includes a three dimensional crosslinked structure, when the coating material is applied to the surface of the metal sheet, the silicone resin tends to be transferred to the surface side of the film, and furthermore, arranged uniformly along the surface of the film. When such a coating film is subjected to a flame treatment, organic groups (such as methyl groups or phenyl groups) that the silicone resin contains are removed evenly, and silanol groups or siloxane bonds are introduced to the surface of the coating film. As a result, hydrophilicity of the surface of the coated metal sheet is uniformly increased, providing very satisfactory rain-streak stain resistance.

Moreover, the silicone resin contained in the coating material of the present invention contains silanol groups in an amount of 5 to 50 mol % relative to the total molar amount of Si atoms in the silicone resin. The silicone resin in which the amount of silanol groups is 5 to 50 mol % relative to the total molar amount of Si atoms has appropriate reactivity and is unlikely to be excessively condensed due to moisture contained in the coating material. Therefore, the silicone resin is unlikely to react in the coating material, thereby providing the coating material with very satisfactory storage stability. In addition, since silanol groups are appropriately bonded to other components in the coating material via hydrogen bonding, after application of the coating material, the silicone resin is unlikely to be evaporated upon heating and drying (such as baking) the film. Therefore, the coating material of the present invention is unlikely to foul the heating apparatus, and furthermore, poor appearance of the coated metal sheet due to silica adhering to the heating apparatus hardly occurs.

Note that the method for producing a coated metal sheet according to the present invention may include a step other than the above-described coating film formation and flame treatment. In the following, each step in the method for producing a coated metal sheet according to the present invention will be described.

(1) Coating Film Formation

In the coating film formation, a coating material containing a particular silicone resin, a fluorine-containing resin, and the like is applied to a metal sheet and cured, thereby obtaining a coating film. A method for applying the coating material to the surface of the metal sheet is not particularly limited, and it may be appropriately selected from methods known in the art. Examples of the method for applying coating material include roll coating method, curtain flow method, spin coating method, air-spray method, airless-spray method and dip-and-draw up method. Among them, the roll coating method is preferred from the viewpoint where a coating film with a desired thickness is likely to be obtained efficiently.

In addition, a method for curing the coating material is appropriately selected depending on the type of a resin in the coating material and the like, and for example, it may be baking by heating. The temperature during the baking treatment is preferably 100 to 300° C., more preferably 180 to 300° C. and further preferably 240 to 280° C. from the viewpoint of preventing decomposition of the resins and the like in the coating material and obtaining a homogeneous coating film. The duration for the baking treatment is not particularly limited, and preferably 3 to 90 seconds, more preferably 10 to 70 seconds and further preferably 40 to 60 seconds from the same viewpoint as described above.

In addition, upon the baking of the coating material, wind may be blown such that the wind velocity on the sheet surface is 0.9 m/s or more in order to cure the coating material within a short time. In the coating material mentioned above, the silicone resin is bonded to other components via hydrogen bonding. Therefore, even if the coating material is cured while wind is blown, the silicone resin is unlikely to be evaporated and the heating apparatus is unlikely to be fouled.

Here, the thickness of the coating film formed on the metal sheet is appropriately selected depending on an application of the coated metal sheet and the like, but it is normally in the range of 3 to 30 µm. The thickness is a value determined through gravimetric method from the specific gravity of the baked coating film and the weight difference of the coated metal sheet before and after the removal of the coating film by sandblasting or the like. When the coating film is too thin, durability and concealing properties of the coating film may be insufficient. On the other hand, when the coating film is too thick, production costs are increased and popping may easily occur during the baking.

Here, for the metal sheet to which the coating material is to be applied, any metal sheets generally used as building boards may be used. Examples of such a metal sheet include plated steel sheets such as hot-dip Zn-55% Al alloy-plated steel sheets; steel sheets such as normal steel sheets and stainless-steel sheets; aluminum sheets; copper sheets; and the like. The metal sheet may have a chemical conversion film, an undercoat coating film or the like formed on its surface as long as it does not hinder the effects of the present invention. Furthermore, the metal sheet may be subjected to a processing for forming irregularities such as embossing and drawing as long as it does not impair the effects of the present invention.

The thickness of the metal sheet is not particularly limited, and is appropriately selected depending on an application of the coated metal sheet. For example, when the coated metal sheet is used for a metal siding material, the thickness of the metal sheet may be 0.15 to 0.5 mm.

Here, the coating material for forming the coating film is only required to at least contain a particular silicone resin, but other than the silicone resin, it may contain a fluorine-containing resin or a curing agent, inorganic particles, organic particles, a coloring pigment, a solvent, or the like.

As mentioned above, the silicone resin is a compound in which alkoxysilane is partially hydrolyzed and condensed, and in its molecular chain, any one or two or more of T-1 unit to T-3 unit, represented by the following general formulas, derived from trialkoxysilane (all of which are also collectively referred to as "T units") are normally included.

[Formula 1]

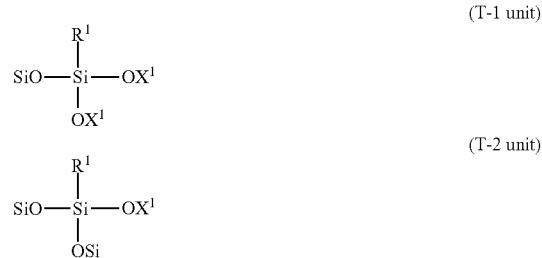

-continued

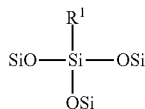 (T-3 unit)

In the general formulas described above, $R^1$ represents a hydrocarbon group that optionally has a substituent. In addition, $X^1$ represents a hydrogen atom or a hydrocarbon group. In the silicone resin, multiple types of T units with different types of above-described $R^1$ and $X^1$ may be included.

$R^1$ is preferably a hydrocarbon group having 1 to 12 carbon atoms, and specific examples thereof include alkyl groups such as methyl group, ethyl group, propyl group, hexyl group and octyl group; aryl groups such as phenyl group, tolyl group, xylyl group and naphthyl group; cycloalkyl groups such as cyclohexyl group, cyclobutyl group and cyclopentyl group; and the like. Among them, methyl group and phenyl group are particularly preferred.

Meanwhile, $X^1$ is preferably a hydrogen atom or a hydrocarbon group having 1 to 8 carbon atoms, and examples of the hydrocarbon group include alkyl groups such as methyl group, ethyl group, propyl group and hexyl group; aryl groups such as phenyl group, tolyl group and xylyl group; cycloalkyl groups such as cyclohexyl group, cyclobutyl group and cyclopentyl group; and the like. Among them, methyl group and ethyl group are particularly preferred.

In addition, in the molecular chain of the silicone resin, either one or both of D-1 unit and D-2 unit, represented by the following general formulas, derived from dialkoxysilane (all of which are also collectively referred to as "D units") may be included.

[Formula 2]

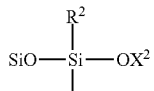 (D-1 unit)

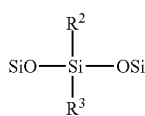 (D-2 unit)

In the general formulas described above, $R^2$ and $R^3$ each independently represent a hydrocarbon group that optionally has a substituent. In addition, $X^2$ represents a hydrogen atom or a hydrocarbon group. Note that, in the silicone resin, multiple types of D units with different types of above-described $R^2$, $R^3$ and $X^2$ may be included.

Each of $R^2$ and $R^3$ is preferably a hydrocarbon group having 1 to 12 carbon atoms, and specific examples thereof include the same groups as above-mentioned $R^1$ for T units. Meanwhile, $X^2$ is preferably a hydrogen atom or a hydrocarbon group having 1 to 8 carbon atoms, and specific examples thereof include the same groups as above-mentioned $X^1$ for T units.

Furthermore, in the molecular chain of the silicone resin, any one or two or more of Q-1 unit to Q-4 unit, represented by the following general formulas, derived from tetraalkoxysilane (all of which are also collectively referred to as "Q units") may be included.

[Formula 3]

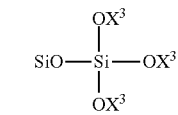 (Q-1 unit)

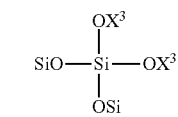 (Q-2 unit)

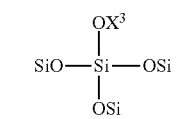 (Q-3 unit)

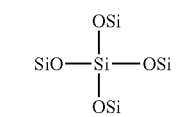 (Q-4 unit)

In the general formulas described above, $X^3$ represents a hydrogen atom or a hydrocarbon group. Note that, in the silicone resin, multiple types of Q units with different types of above-described $X^3$ may be included.

$X^3$ is preferably a hydrogen atom or a hydrocarbon group having 1 to 8 carbon atoms, and specific examples thereof include the same groups as above-mentioned $X^1$ for T units.

The silicone resin has a structure in which the above-described T units, D units and/or Q units are bonded in a three dimensional manner. As mentioned above, the amount (number of moles) of silanol groups in the silicone resin contained in the coating material of the present invention is 5 to 50 mol % and more preferably 15 to 40 mol % relative to the total molar amount of Si atoms. When the amount of silanol groups is greater than 50 mol % relative to the total molar amount of Si atoms, the reactivity of the silicone resin tends to be increased and the storage stability of the coating material tends be lowered. On the other hand, when the amount of silanol groups is less than 5 mol % relative to the total molar amount of Si atoms, the silicone resin is unlikely to be bonded to other components in the coating material (such as an acrylic resin) via hydrogen bonding, and the silicone resin is likely to be evaporated upon curing the coating material.

In contrast, when the amount of silanol groups in the silicone resin is in the range described above, not only the storage stability of the coating material is enhanced, but also the silicone resin is unlikely to be evaporated upon the above-mentioned baking after the application of the coating material and the heating apparatus is unlikely to be fouled.

The number of moles of Si atoms contained in the silicone resin and the amount of silanol groups contained in the silicone resin can be specified through analysis with $^{29}$Si-NMR and analysis with $^1$H-NMR. In addition, the amount of silanol groups in the silicone resin can be adjusted through the charging ratio of T units, D units and Q units, or the degree of condensation reaction. For example, when trialkoxysilane is used to prepare a silicone resin, by prolonging the duration for condensation reaction or the like, the amount of T-3 unit is increased and the amount of silanol groups is decreased.

Moreover, the silicone resin contains Si atoms derived from trialkoxysilane, that is, Si atoms constituting T units preferably in an amount of 50 to 100 mol % and more preferably in an amount of 60 to 100 mol % relative to the total molar amount of Si atoms that the silicone resin contains. When the amount of T units is less than 50 mol % (in particular, when the amount of D units is greater than 50 mol %), the silicone resin tends to form a micelle structure and the silicone resin is likely to be enriched in the form of sea-island on the surface of the coating film. As a result, it is hard to uniformly enhance hydrophilicity of the surface of the coating film, and unevenness in rain-streak stain resistance of the coating film is likely to occur. Note that whether the silicone resin is enriched in the form of sea-island on the surface of the coating film or not can be confirmed by analyzing the surface of the coating film after the flame treatment with an AFM (atomic force microscope). For example, the etching depth through the flame treatment in the sea part is different from that in the island part on the surface of the coating film. Accordingly, the sea-island distribution of the silicone resin can be confirmed through irregularities on the surface of the coating film.

In contrast, when the amount of T units is 50 mol % or more, the silicone resin is unlikely to form a micelle structure and the silicone resin is likely to be enriched uniformly on the surface of the coating film. As a result, the rain-streak stain resistance of a coated metal sheet to be obtained by applying the coating material becomes satisfactory. The amount of Si atoms constituting T units can be specified through analysis with $^2$Si-NMR.

In addition, the proportion of the number of moles of aryl groups directly bonded to Si atoms of the silicone resin based on the number of moles of alkyl groups directly bonded to Si atoms of the silicone resin, that is, the proportion of aryl groups/alkyl groups is preferably 20 to 80% and more preferably 30 to 70%. When the molar ratio of aryl groups is increased, the silicone resin is more likely to be dissolved in other components in the coating material. However, when the proportion of aryl groups becomes excessive, the reaction speed upon formation of the coating film is decreased significantly, and it may be hard to obtain a sufficient crosslinking density. The above-described ratio of alkyl groups and aryl groups can be specified through analysis with $^1$H-NMR.

Here, the weight average molecular weight of the silicone resin is preferably 700 to 50,000 and more preferably 1,000 to 10,000. When the weight average molecular weight of the silicone resin is less than 700, the silicone resin is likely to be evaporated upon the above-mentioned baking after the application of the coating material, and therefore, the heating apparatus may be fouled or the amount of the silicone resin on the surface of a coating film to be obtained may become small. On the other hand, when the weight average molecular weight is greater than 50,000, the viscosity of the coating material is likely to be increased and the storage stability is lowered. Note that the above-described weight average molecular weight of the silicone resin is in terms of polystyrene, measured by gel permeation chromatography (GPC).

The coating material contains the silicone resin preferably in an amount of 1 to 10 parts by mass and more preferably in an amount of 2 to 6 parts by mass relative to 100 parts by mass of the solid content of the coating material. When the coating material contains the silicone resin in an amount within the range described above, hydrophilicity of the surface of a coating film to be obtained can be enhanced sufficiently and rain-streak stains are unlikely to occur.

The silicone resin mentioned above can be prepared through hydrolytic polymerization of trialkoxysilane or the like. Specifically, alkoxysilane such as trialkoxysilane or a partial condensate thereof is dispersed in water or a solvent such as an alcohol. Then, the pH of that dispersion is preferably adjusted to 1 to 7, and more preferably to 2 to 6, and alkoxysilane or the like is hydrolyzed. Subsequently, by subjecting the hydrolysate to dehydrative condensation, the silicone resin is obtained. The molecular weight or the like of a silicone resin to be obtained can be adjusted through the duration of dehydrative condensation or the like. The condensation of the hydrolysate can be carried out in succession with the above-described hydrolysis, and the condensation reaction can be accelerated by evaporating an alcohol produced through the hydrolysis or water.

Note that alkoxysilane used for preparation of the silicone resin is appropriately selected depending on a desired structure of the silicone resin. Examples of the trialkoxysilane compound include methyltrimethoxysilane, methyltriethoxysilane, methyltriisopropoxysilane, methyltributoxysilane, ethyltrimethoxysilane, ethyltriethoxysilane, ethyltriisopropoxysilane, propyltrimethoxysilane, propyltriethoxysilane, propyltriisopropoxysilane, butyltrimethoxysilane, hexyltrimethoxysilane, decyltrimethoxysilane, octadecyltrimethoxysilane, phenyltrimethoxysilane, phenyltriethoxysilane, methyltrisilanol, phenyltrisilanol and the like.

Examples of dialkoxysilane include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, diphenyldimethoxysilane and the like.

Furthermore, examples of tetraalkoxysilane include tetramethoxysilane, tetraethoxysilane, tetraisopropoxysilane, tetrabutoxysilane, tetramethoxysilane and the like.

Upon preparation of the silicone resin, partial condensates of the above-described trialkoxysilane, dialkoxysilane, and tetramethoxysilane may be used as a raw material.

Here, the fluorine-containing resin contained in the coating material functions as a binder in a coating film to be obtained from the coating material. The fluorine-containing resin may be any resin as long as it contains fluorine in its molecule, and there is no particular limitation on its type. Examples of the fluorine-containing resin include (i) a copolymer between a fluoroolefin and a monomer that is copolymerizable therewith (hereinafter also simply referred to as a "(i) copolymer") and (ii) polyvinylidene fluoride.

Examples of the fluoroolefin contained in the (i) copolymer between a fluoroolefin and a monomer that is copolymerizable therewith include fluoroolefins having 2 to 3 carbon atoms such as tetrafluoroethylene, chlorotrifluoroethylene, trifluoroethylene, hexafluoropropylene, and pentafluoropropylene. The (i) copolymer may contain only one of these fluoroolefins or two or more of them.

Examples of the monomer that is copolymerizable with the above-described fluoroolefins include vinyl ethers, vinyl esters, allyl ethers, allyl esters, isopropenyl ethers, isopropenyl esters, metallyl ethers, metallyl esters, α-olefins, and (meth)acrylate esters. The (i) copolymer may contain only one of these monomers or two or more of them. In the present specification, (meth)acrylate refers to either acrylate or methacrylate, or both.

Examples of the vinyl ether include alkyl vinyl ethers such as ethyl vinyl ether, butyl vinyl ether, cyclohexyl vinyl ether, fluoroalkyl vinyl ethers, and perfluoro(alkyl vinyl ethers). Examples of the vinyl ester include fatty acid vinyl esters such as ethenyl 2,2-dimethyloctanoate, vinyl butyrate, vinyl acetate, vinyl pivalate, and vinyl versatate.

Examples of the above-described allyl ether include alkyl allyl ethers such as ethyl allyl ether and cyclohexyl allyl ether. Examples of the allyl ester include fatty acid allyl esters such as allyl propionate and allyl acetate. Examples of the isopropenyl ether include alkyl isopropenyl ethers such as methyl isopropenyl ether. Examples of the isopropenyl ester include isopropenyl acetate. Examples of the metallyl ether include ethylene glycol monometallyl ether, and examples of the metallyl ester include β-metallyl acetate. Examples of the α-olefin include ethylene, propylene, and isobutylene. Examples of the (meth)acrylate ester include methyl methacrylate and ethyl methacrylate.

Among the above-described monomers, vinyl ethers, vinyl esters, allyl ethers, and allyl esters are preferable in that they have excellent copolymerizability with fluoroolefins. In addition, alkyl vinyl ethers, fatty acid vinyl esters, alkyl allyl ethers, and fatty acid allyl esters with a linear, branched, or alicyclic alkyl group having 1 to 10 carbon atoms are particularly preferable.

The (i) copolymer may further contain a structure derived from a monomer including a group that is crosslinkable with a curing agent, which will be mentioned later. Examples of the monomer including a group that is crosslinkable with a curing agent include hydroxybutyl vinyl ether, hydroxybutyl allyl ether, ethylene glycol monoallyl ether, cyclohexanediol monovinyl ether, acrylic acid, methacrylic acid, crotonic acid, undecenoic acid, glycidyl vinyl ether, and glycidyl allyl ether. Also, a carboxyl group may be introduced by allowing the structure derived from the above-mentioned monomers to react with a compound having a carboxyl group, such as succinic anhydride. Furthermore, a double bond may be introduced by allowing the structure derived from the above-mentioned monomers to react with a group having a double bond, such as isocyanate alkyl methacrylate.

The amount of monomers derived from the fluoroolefin contained in the (i) copolymer is preferably 30 to 70 mol % and more preferably 40 to 70 mol % relative to the total amount of monomer units contained in the (i) copolymer. When the amount of monomers derived from the fluoroolefin is 30 mol % or more, the weather resistance of a coated metal sheet to be obtained tends to be satisfactory. On the other hand, when the amount of monomers derived from the fluoroolefin is 70 mol % or less, the compatibility with other components in the coating material becomes satisfactory.

The weight average molecular weight of the (i) copolymer is preferably 3,000 to 500,000 and more preferably 5,000 to 50,000. When the weight average molecular weight of the (i) copolymer is within the range described above, the compatibility with other components in the coating material becomes satisfactory and a film with high strength is obtained. The above-described weight average molecular weight is a value measured by gel permeation chromatography (a value in terms of styrene).

Here, when the coating material contains the above-described (i) copolymer, it may also contain a curing agent together. When the coating material contains a curing agent, a crosslinked structure is likely to be formed and a coating film to be obtained is likely to become tougher. Examples of the curing agent include aminoplast curing agents, isocyanate curing agents, polybasic acid curing agents, and polyvalent amine curing agents. The coating material may contain only one of these curing agents or two or more of them.

Examples of the aminoplast curing agent include methylol melamines, methylol guanamines, and methylol ureas. Examples of the methylol melamine include methylol melamines etherified with lower alcohols, such as butylated methylol melamine and methylated methylol melamine, and epoxy-modified methylol melamines. Examples of the methylol urea include alkylated methylol ureas such as methylated methylol urea and ethylated methylol urea.

Examples of the isocyanate curing agent include polyvalent isocyanate compounds and blocked products thereof. Polyvalent isocyanate compounds can be compounds having two or more isocyanate groups. Examples of the polyvalent isocyanate compound include aliphatic polyvalent isocyanate compounds such as ethylene diisocyanate, propylene diisocyanate, tetramethylene diisocyanate, hexamethylene diisocyanate, hexamethylene triisocyanate, and lysine diisocyanate; alicyclic polyvalent isocyanate compounds such as isophorone diisocyanate, dicyclohexylmethane diisocyanate, and diisocyanate methylcyclohexane; and aromatic isocyanate compounds such as m-xylene diisocyanate and p-xylene diisocyanate.

Examples of the modified products and multimeric products of polyvalent isocyanate compounds include urethane modified products, urea modified products, isocyanurate modified products, biuret modified products, allophanate modified products, and carbodiimide modified products.

Examples of the polybasic acid curing agent include long chain aliphatic dicarboxylic acids and aromatic polyvalent carboxylic acids, which may be acid anhydrides thereof.

Examples of the polyvalent amine curing agent include ethylenediamine and ethylenetriamine.

The coating material contains the curing agent described above preferably in an amount of 0.1 to 100 parts by mass and more preferably in an amount of 1 to 50 parts by mass relative to 100 parts by mass of the (i) copolymer. By setting the amount to 0.1 parts by mass or more, the hardness of the coating film tends to be increased. On the other hand, when the amount is set to 100 parts by mass or less, the processability and impact resistance of a coated metal sheet to be obtained are likely to be satisfactory.

Meanwhile, the (ii) polyvinylidene fluoride can be a vinylidene fluoride homopolymer or a copolymer between vinylidene fluoride and another monomer. However, the polyvinylidene fluoride contains monomers derived from vinylidene fluoride preferably in an amount of 50 mol % or more and more preferably in an amount of 60 mol % or more relative to the total amount of monomers constituting the polyvinylidene fluoride.

Examples of the monomer that is copolymerizable with vinylidene fluoride include fluoroolefins, vinyl ethers, and vinyl esters, which can be the same as those exemplified in the above-mentioned (i) copolymer. The (ii) polyvinylidene fluoride may contain only one of the structures derived from these monomers or two or more of them.

The weight average molecular weight of the (ii) polyvinylidene fluoride is preferably 100,000 or more, more preferably 200,000 or more, and further preferably 400,000 or more. When the weight average molecular weight of the (ii) polyvinylidene fluoride is within the range described above, the compatibility with other components in the coating material becomes satisfactory and a coating film with high strength is obtained. The above-described weight average molecular weight is a value measured by gel permeation chromatography (a value in terms of styrene).

When the coating material contains the above-described (ii) polyvinylidene fluoride, it may also contain a curing agent together. When the coating material contains a curing agent, a crosslinked structure is likely to be formed and a coating film to be obtained is likely to become tougher. Examples of the curing agent can be aminoplast curing agents, isocyanate curing agents, and the like, which can be the same as those combined with the above-mentioned (i) copolymer. The coating material may contain only one of these curing agents or two or more of them. The amount of the curing agent can be the same as in the case of being combined with the (i) copolymer.

In addition, when the coating material contains the above-described (ii) polyvinylidene fluoride, it is preferable for the coating material to further contain a (meth)acrylic resin from the viewpoint of its flowability, adhesion to the metal sheet, and the like. The (meth)acrylic resin may be thermoplastic, or may be thermosetting.

Examples of the thermoplastic (meth)acrylic resin include polymers containing 70 mol % or more of monomers derived from an alkyl (meth)acrylate ester, relative to the total amount of monomer units constituting (meth)acrylic acid. Examples of the alkyl (meth)acrylate ester include alkyl (meth)acrylate esters having 3 to 12 carbon atoms of alkyl (meth)acrylate ester monomers and the like, such as methyl (meth)acrylate, ethyl (meth)acrylate, propyl (meth)acrylate, butyl (meth)acrylate, amyl (meth)acrylate, and octyl (meth)acrylate. The (meth)acrylic resin may include only one of the structures derived from these alkyl (meth)acrylate esters or two or more of them.

In addition, the thermoplastic (meth)acrylic resin may have a structure derived from a monomer other than the above, and may contain, for example, a monomer derived from styrene, vinyl toluene, (meth)acrylonitrile, or vinyl chloride.

The weight average molecular weight of the thermoplastic (meth)acrylic resin is preferably 40,000 to 300,000 and more preferably 50,000 to 200,000. The weight average molecular weight of the thermoplastic (meth)acrylic resin is a value measured by GPC (in terms of styrene).

When the (ii) polyvinylidene fluoride is combined with the above-described thermoplastic (meth)acrylic resin, the amount of the (meth)acrylic resin is preferably 150 parts by mass or less and more preferably 10 to 50 parts by mass relative to 100 parts by mass of the (ii) polyvinylidene fluoride. When the thermoplastic (meth)acrylic resin is mixed in within the range described above, the coating material tends to have satisfactory flowability.

On the other hand, the thermosetting (meth)acrylic resin can be a (meth)acrylic resin having crosslinkable reactive groups such as hydroxyl groups, carboxyl groups, glycidyl groups, active halogens, and isocyanate groups. In this case, alkylated melamines, polyols, polyamines, polyamides, polyoxiranes, and the like are used as curing agents for the thermosetting (meth)acrylic resin.

The weight average molecular weight of the thermosetting (meth)acrylic resin is preferably 1,000 to 20,000 and more preferably 2,000 to 10,000. The weight average molecular weight of the thermosetting (meth)acrylic resin is a value measured by GPC (in terms of styrene).

When the (ii) polyvinylidene fluoride is combined with the above-described thermosetting (meth)acrylic resin, the amount of the (meth)acrylic resin is preferably 150 parts by mass or less and more preferably 10 to 50 parts by mass relative to 100 parts by mass of the (ii) polyvinylidene fluoride. When the thermosetting (meth)acrylic resin is mixed in within the range described above, the coating material tends to have satisfactory flowability or the like.

The amount of the fluorine-containing resin contained in the coating material is appropriately selected depending on an application of the coating material. From the viewpoint of the strength of a coating film to be obtained, the coating material contains the fluorine-containing resin described above preferably in an amount of 20 to 95 parts by mass and more preferably in an amount of 30 to 80 parts by mass relative to 100 parts by mass of the solid content of the coating material.

The coating material may contain a silicone resin curing catalyst. The silicone resin curing catalyst functions as a catalyst for crosslinking the silicone resin and the fluorine-containing resin in a coating film to be obtained from the coating material. As the silicone resin curing catalyst, a catalyst containing a known metal that has catalytic activity in the dehydration condensation reaction of silanol groups (for example, aluminum, zinc, tin, or the like) or an amine-modified acid catalyst can be used.

As the silicone resin curing catalyst, any of those commercially available can be used, such as the trade names CAT-AC and D-15 (manufactured by Shin-Etsu Chemical Co., Ltd.), and NACURE 2500 and NACURE 4167 (manufactured by King Industries, Inc.).

The amount of the silicone resin curing catalyst contained in the coating material is appropriately selected depending on an application of the coating material. The coating material contains the silicone resin curing catalyst described above preferably in an amount of 0.1 to 3.0 parts by mass and more preferably in an amount of 0.5 to 1.0 parts by mass relative to 100 parts by mass of the above-described resins (total of the fluorine-containing resin and the (meth)acrylic resin). When the amount of the silicone resin curing catalyst is within the range described above, the durability of a coating film to be obtained from the coating material is enhanced.

In addition, the coating material may contain inorganic particles or organic particles. When the coating material contains them, it becomes easier to adjust the surface roughness of a coating film to be obtained or the like. Here, the average particle diameter of inorganic particles or organic particles is preferably 4 to 80 μm and more preferably 10 to 60 μm. The average particle diameter of inorganic particles or organic particles is a value measured by coulter counter method. Note that the shape of inorganic particles or organic particles is not particularly limited, but from the viewpoint where it is easy to adjust the surface condition of a coating film to be obtained, the shape is preferably generally spherical.

Examples of inorganic particles include silica, barium sulfate, talc, calcium carbonate, mica, glass beads and glass flakes. Examples of organic particles include resin beads composed of an acrylic resin or a polyacrylonitrile resin. Those resin beads may be produced using methods known in the art, or may be commercial products. Examples of commercially available acrylic resin beads include "TAFTIC AR650S (average particle diameter 18 μm)," "TAFTIC AR650M (average particle diameter 30 μm)," "TAFTIC AR650MX (average particle diameter 40 μm)," "TAFTIC AR650MZ (average particle diameter 60 μm)" and "TAFTIC AR650ML (average particle diameter 80 μm)," all of which are manufactured by TOYOBO CO., LTD. Examples of commercially available polyacrylonitrile resin beads include "TAFTIC A-20 (average particle diameter 24 μm)," "TAFTIC YK-30 (average particle diameter 33 μm)," "TAFTIC YK-50 (average particle diameter 50 μm)" and "TAFTIC YK-80 (average particle diameter 80 μm)," all of which are manufactured by TOYOBO CO., LTD.

The amount of inorganic particles and/or organic particles contained in the coating material is appropriately selected depending on a desired surface condition of the coating film or the like. Normally, the total amount of inorganic particles and/or organic particles may be 1 to 40 parts by mass relative to 100 parts by mass of the solid content of the coating material.

In addition, the coating material may further contain a coloring pigment as necessary. The average particle diameter of the coloring pigment may be, for example, 0.2 to 2.0 μm. Examples of the coloring pigment include titanium oxide, iron oxide, yellow oxide of iron, phthalocyanine blue, carbon black and cobalt blue. When the coating material contains a coloring pigment, the amount thereof is preferably 20 to 60 parts by mass and more preferably 30 to 55 parts by mass relative to 100 parts by mass of the solid content of the coating material for metal sheets.

Furthermore, the coating material may further contain a wax as necessary. Examples of the wax include, but are not limited to, polyolefin waxes (polyethylene, polypropylene, and the like), fluorinated waxes (polytetrafluoroethylene, polychlorotrifluoroethylene, polyvinylidene fluoride, polyvinyl fluoride, and the like), paraffin waxes, and stearic acid waxes. Also, the amount of the wax is appropriately selected depending on the type of wax and the like, but it can be about 2 to 15% by mass relative to 100 parts by mass of the solid content of the coating material.

In addition, the coating material may contain an organic solvent as necessary. The organic solvent is not particularly limited as long as it can sufficiently dissolve or disperse the above-described silicone resin, fluorine-containing resin and its curing agent, acrylic resin, silicone resin curing catalyst, inorganic particles, organic particles, and the like. Examples of the organic solvent include hydrocarbon solvents such as toluene, xylene, Solvesso (R) 100 (trade name; manufactured by ExxonMobil Chemical), Solvesso (R) 150 (trade name; manufactured by ExxonMobil Chemical), and Solvesso (R) 200 (trade name; manufactured by ExxonMobil Chemical); ketone solvents such as methyl ethyl ketone, methyl isobutyl ketone, cyclohexanone, and isophorone; ester solvents such as ethyl acetate, butyl acetate, ethylene glycol monoethyl ether acetate, and dimethyl phthalate; alcohol solvents such as methanol, isopropyl alcohol, and n-butyl alcohol; ether alcohol solvents such as ethylene glycol monoethyl ether and diethylene glycol monobutyl ether; and the like. The coating material may include only one of these organic solvents or two or more of them. Among them, isophorone, xylene, ethylbenzene, cyclohexanone, and dimethyl phthalate are preferred from the compatibility with the fluorine-containing resin or the like.

A method for preparing the coating material described above is not particularly limited. The coating material may be prepared by mixing the above materials, followed by stirring or dispersing the same, in the same manner as coating materials known in the art. Note that the silicone resin may be premixed with other components. Alternatively, materials other than the silicone resin may be premixed and the silicone resin may be mixed in later.

(2) Flame Treatment

After the above-mentioned coating film formation, a flame treatment is carried out, in which the coating film is subjected to a flame treatment. By carrying out the above-mentioned flame treatment of the coating film, its surface is hydrophilized. When the coating film of the above-mentioned coating material is subjected to a flame treatment, hydrocarbon groups (such as methyl groups or phenyl groups) of the silicone resin on the surface of the coating film are decomposed and silanol groups or siloxane bonds are produced. As a result of this, the hydrophilicity of the surface of the coating film is enhanced and the rain-streak stain resistance is enhanced.

The flame treatment may be, for example, a method in which a metal sheet having a coating film formed thereon is placed on a carrier such as a belt conveyor, and while the metal sheet is moved in a certain direction, flame is projected onto the coating film with a burner for flame treatment.

Here, the amount of flame treatment is preferably 30 to 1,000 kJ/m$^2$ and more preferably 100 to 600 kJ/m$^2$. Note that the "amount of flame treatment" in the present specification refers to the amount of heat per unit area of a coated metal sheet, which is calculated on the basis of the amount supplied of a combustion gas such as LP gas. The amount of flame treatment can be adjusted according to the distance between the burner head of the burner for flame treatment and the surface of the coating film, the conveying speed of the coating film, and the like. When the amount of flame treatment is less than 30 kJ/m$^2$, uneven treatment may occur and it is difficult to evenly hydrophilize the surface of the coating film. On the other hand, when the amount of flame treatment is greater than 1,000 kJ/m$^2$, the coating film may be oxidized and turn yellow.

Hereinafter, one example of a burner for flame treatment that can be used in the flame treatment of the coating film of the coating material of the present invention will be described; however, the flame treatment method is not limited thereto.

Figure 1B:
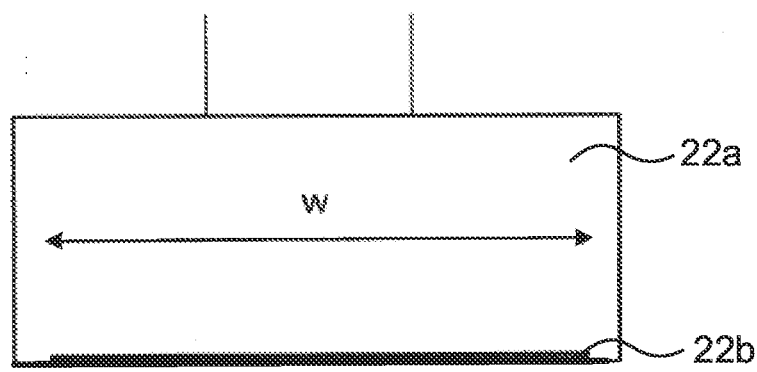
FIG. 1B is a front view of the burner head.
Figure 1C:
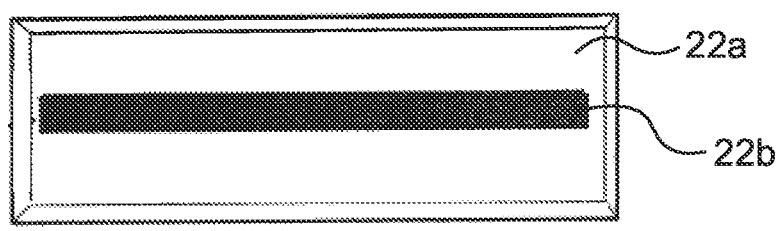
FIG. 1C is a bottom view of the burner head.

The burner for flame treatment has a gas supply pipe for supplying a combustible gas; a burner head for burning the combustible gas supplied from the gas supply pipe; and a support member for supporting them. FIGS. 1A, 1B and 1C schematically illustrate the burner head of the burner for flame treatment. FIG. 1A is a side view of the burner head, FIG. 1B is a front view of that burner head, and FIG. 1C is a bottom view of that burner head. For convenience sake, a part corresponding to burner port 22b is emphasized by illustrating with a thick line in FIGS. 1A and 1B; however, actually, burner port 22b cannot be seen from the side or the front.

Burner head 22 has housing 22a having the shape of a generally square pole, connected to gas supply pipe 23; and burner port 22b disposed on the underside of the housing. Burner head 22 burns combustible gas supplied from gas supply pipe 23 at burner port 22b.

The structure inside housing 22a of burner head 22 may be the same as the structure of a common burner for flame treatment, and may have, for example, a channel formed therein for allowing the combustible gas supplied from gas supply pipe 23 to flow toward burner port 22b. In addition, the width of housing 22a in a front view is appropriately selected depending on the width of a coating film to be subjected to the flame treatment. Moreover, the width of housing 22a in a side view is appropriately selected depending on the width of burner port 22b in the conveyance direction of the coating film (represented by L in FIG. 1A).

Meanwhile, burner port 22b is a through hole provided in the underside of housing 22a. The shape of burner port 22b is not particularly limited, and it may have any shape such as a rectangular or circular shape. However, from the viewpoint of carrying out the flame treatment uniformly in the width direction of the coating film, a rectangular shape is particularly preferred. In addition, the width of burner port 22b in the direction perpendicular to the conveyance direction of the coating film (represented by W in FIG. 1B) may be the same as or longer than the width of the coating film to be subjected to the flame treatment, and, for example, it may be about 50 to 150 cm. On the other hand, the width of burner port 22b in the conveyance direction of the coating film (represented by L in FIG. 1A) can be appropriately set depending on the discharge stability of the combustible gas or the like, and it may be about 1 to 8 mm.

Gas supply pipe 23 is a gas channel, one end of which is connected to burner head 22 and the other end of which is connected to a gas mixing section (not illustrated). The gas mixing section is connected to a combustion gas source (not illustrated) such as a combustion gas cylinder, and to a combustion-assisting gas source (not illustrated) such as an air cylinder, an oxygen cylinder, compressed air or air by a blower. The gas mixing section is a member for mixing the combustion gas and the combustion-assisting gas in advance. Note that the concentration of oxygen in the combustible gas (mixed gas of the combustion gas and the combustion-assisting gas) supplied from the gas mixing section to gas supply pipe 23 is preferably at a constant level, and the gas mixing section preferably has an oxygen feeder for supplying oxygen to gas supply pipe 23 as necessary.

Examples of the combustion gas described above include hydrogen, liquefied petroleum gas (LPG), liquefied natural gas (LNG), acetylene gas, propane gas and butane. Among them, from the viewpoint of easiness of forming a desired flame, LPG or LNG is preferred, and LPG is particularly preferred. On the other hand, examples of the combustion-assisting gas include air and oxygen, and the air is preferred due to the aspect of handleability.

The mixing ratio between the combustion gas and the combustion-assisting gas in the combustible gas supplied to burner head 22 via gas supply pipe 23 can be appropriately set depending on the types of the combustion gas and the combustion-assisting gas. For example, when the combustion gas is LPG and the combustion-assisting gas is air, the volume of the air is preferably 24 to 27, more preferably 25 to 26 and further preferably 25 to 25.5 relative to one volume of LPG. Alternatively, when the combustion gas is LNG and the combustion-assisting gas is air, the volume of the air is preferably 9.5 to 11, more preferably 9.8 to 10.5 and further preferably 10 to 10.2 relative to one volume of LNG.

In the burner for flame treatment, the flame treatment of a coating film is performed while the coating film is moved. The flame treatment described above can be carried out by, while discharging the combustible gas from burner port 22b of burner head 22 toward the coating film, burning the combustible gas. The distance between burner head 22 and the coating film is appropriately selected depending on the amount of flame treatment as mentioned above, but it may be normally about 10 to 120 mm, preferably 25 to 100 mm and more preferably 30 to 90 mm. When the distance between the burner head and the coating film is too small, the coating film may be brought into contact with the burner head due to a warp or the like of the metal sheet. On the other hand, when the distance between the burner head and the coating film is too large, a large amount of energy is required for the flame treatment. Note that, during the flame treatment, flame may be projected perpendicular to the surface of the coating film from the burner for flame treatment, but the flame may also be projected toward the surface of the coating film from the burner for flame treatment such that a certain angle is formed relative to the surface of the coating film.

In addition, the moving speed of the coating film is appropriately selected depending on the amount of flame treatment mentioned above, but normally, it is preferably 5 to 70 m/min, more preferably 10 to 50 m/min, and further preferably 20 to 40 m/min. By moving the coating film at a speed of 5 m/min or more, the flame treatment can be carried out efficiently. On the other hand, when the moving speed of the coating film is too fast, the movement of the coating film is likely to cause an air current to occur, thereby resulting in an insufficient flame treatment.

Figure 2A:
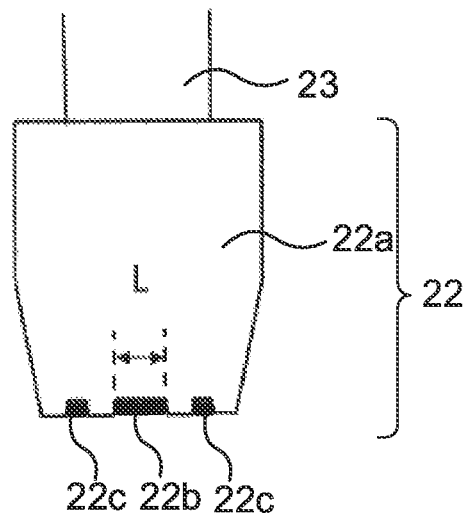
FIG. 2A is a side view of a burner head of another burner for flame treatment.
Figure 2B:
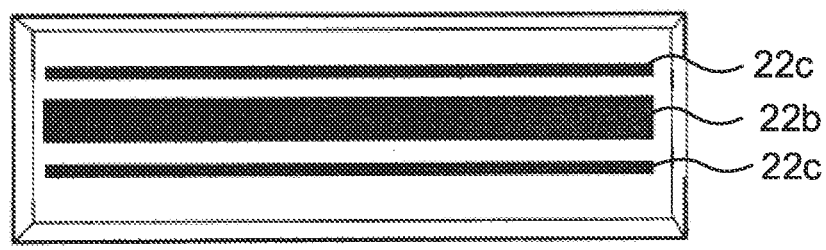
FIG. 2B is a bottom view of the burner head.

Note that, in the above description, burner head 22 has only one burner port 22b in housing 22a; however, the structure of burner head 22 is not limited thereto. For example, as illustrated in FIGS. 2A and 2B, burner head 22 may have auxiliary burner port 22c parallel to burner port 22b. FIG. 2A is a side view of such a burner head, and FIG. 2B is a bottom view of that burner head. For convenience sake, parts corresponding to burner port 22b and auxiliary burner port 22c are emphasized by illustrating with a thick line in FIG. 2A; however, actually, burner port 22b and auxiliary burner port 22c cannot be seen from the side or the front. Here, the spacing between burner port 22b and auxiliary burner port 22c is preferably 2 mm or more, and may be, for example, 2 mm to 7 mm. In this instance, housing 22a has a structure such that a very small amount of combustible gas passes through auxiliary burner port 22c. The amount of the combustible gas discharged from auxiliary burner port 22c is preferably 5% or less and more preferably 3% or less relative to the amount of the combustible gas discharged from burner port 22b. The flame generated at auxiliary burner port 22c exerts little influence on the surface treatment of the coating film, but the presence of auxiliary burner port 22c increases the rectilinearity of the combustible gas discharged from burner port 22b, thereby forming a steadier flame.

Moreover, prior to the flame treatment mentioned above, a preheating treatment for heating the surface of the coating film to 40° C. or higher may be carried out. When a flame is applied to a coating film formed on the surface of a metal sheet having a high thermal conductivity (for example, a metal sheet having a thermal conductivity of 10 W/mK or more), water vapor generated by the combustion of the combustible gas is cooled and becomes water, which temporarily stays on the surface of the coating film. Then, that water may absorb energy upon the flame treatment to become water vapor, thereby inhibiting the flame treatment. Responding to this, by heating the surface of the coating film (metal sheet) in advance, the generation of water upon the application of flame can be suppressed.

A method for preheating the coating film is not particularly limited, and a heating apparatus generally referred to as a drying oven may be used. For example, a batch-type drying oven (also referred to as a "safe-type oven") may be used. Specific examples thereof include a low temperature-thermostat manufactured by Isuzu Seisakusho Co., Ltd (Model: Mini-Katarina MRLV-11), an automatic ejection dryer manufactured by Tojo Netsugaku Co., Ltd (Model:

ATO-101) and a simple dryer having an explosion-proof specification manufactured by Tojo Netsugaku Co., Ltd (Model: TNAT-1000).

As described above, according to the method for producing a coated metal sheet of the present invention, the silicone resin can be enriched on the surface of the coating film without unevenness, and the hydrophilicity of a coated metal sheet to be obtained can be enhanced uniformly. In addition, by using the above-mentioned coating material to produce a coated metal sheet, there is less chance of fouling the heating apparatus when the coating material is baked. Therefore, according to the method for producing a coated metal sheet of the present invention, a coated metal sheet that is applicable to exterior building materials for various buildings and the like and is less likely to suffer the occurrence of rain-streak stains can be produced efficiently. Also, the above-mentioned coating material has another advantage of having satisfactory storage stability.

2. Coated Metal Sheet

Figure 3:
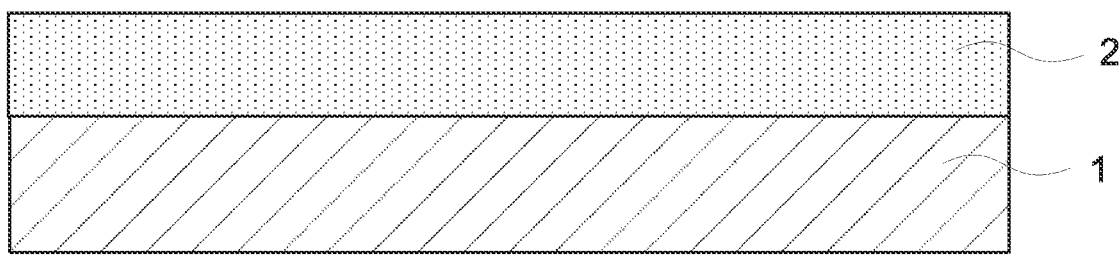
FIG. 3 is a schematic cross-sectional view of a coated metal sheet of the present invention.

As illustrated in FIG. 3, coated metal sheet 100 according to the present invention has metal sheet 1 and fluorinated coating film 2 (hereinafter also simply referred to as "coating film 2") formed on that metal sheet 1 and containing a cured product of a silicone resin and a fluorine-containing resin, which will be described below. That coated metal sheet 100 can be produced through the above-mentioned method for producing a coated metal sheet.

As mentioned above, the silicone resin includes a three dimensional crosslinked structure. Therefore, as described in the above-mentioned method for producing a coated metal sheet, when a coating material containing the silicone resin is applied to the surface of metal sheet 1, the silicone resin tends to be arranged uniformly along the surface of the film. Then, when a hydrophilization treatment (flame treatment) is carried out on a cured film of the silicone resin, organic groups that the surface of the cured film contains are removed evenly, and silanol groups or siloxane bonds are introduced. As a result, hydrophilicity of the surface of coated metal sheet 100 (the surface of coating film 2) is uniformly increased, providing very satisfactory rain-streak stain resistance.

Here, coating film 2 made as described above exhibits values as described below when the surface thereof is analyzed with X-ray electron spectroscopy (hereinafter also referred to as XPS method). In the first place, when the surface of the coating film is measured with XPS method using an AlKα ray as an X-ray source, $Si_a$, the proportion of Si atoms based on the total amount of Si atoms, F atoms, C atoms, and O atoms, is 8 atm % or more. $Si_a$ is more preferably 9 atm % or more and further preferably 10 atm % or more. $Si_a$ is proportional to the amount of enrichment of the silicone resin to the surface of the coating film, and when $Si_a$ is 8 atm % or more, the uniformity of the surface tends to be increased and the rain-streak stain resistance after the flame treatment tends to be satisfactory.

Moreover, when x is defined to be the ratio of the amount of O atoms to the amount of C atoms upon the above-described measurement with XPS method (the amount of O atoms/the amount of C atoms), x is 0.8 or more. x is more preferably 0.9 or more and further preferably 1.0 or more. x represents the ratio of the amount of O atoms derived from siloxane bonds or silanol groups to the amount of C atoms derived from organic groups present on the surface of the coating film. That is, when the flame treatment mentioned above removes organic groups derived from the silicone resin and siloxane bonds or silanol groups are introduced, x becomes larger. Then, when x is 0.8 or more, hydrophilicity of the surface of the coating film (rain-streak stain resistance of the coated metal sheet) becomes particularly satisfactory.

In addition, when the C1s peak top in an X-ray electron spectroscopic spectrum obtained upon the above-described analysis of the surface of the coating film with XPS method is corrected to be 285 eV and a $Si_{2p}$ spectrum is separated into a peak corresponding to 103.5 eV and a peak corresponding to 102.7 eV, y is 0.6 or more, wherein y is the ratio ($Si_{inorganic}$/the peak area of the entire $Si_{2p}$ spectrum) of the peak area of 103.5 eV ($S_{inorganic}$) to the peak area of the entire $Si_{2p}$ spectrum. y is more preferably 0.65 or more and more preferably 0.7 or more.

The $Si_{2p}$ spectrum is a spectrum observed in the vicinity of 101 to 106 eV when the C1s peak top in the X-ray electron spectroscopic spectrum is corrected to be 285 eV, and it includes both of a peak of the entire Si atoms, that is, a peak of organic Si atoms to which carbon is bonded (102.7 eV) and a peak of inorganic Si atoms to which oxygen is bonded (constituting siloxane bonds or silanol groups) (103.5 eV). That is, y represents the ratio of inorganic Si atoms (Si atoms constituting siloxane bonds or silanol groups) to the total amount of Si on the surface of the coating film, and when the above-mentioned y is 0.6 or more, hydrophilicity of the surface of the coating film (rain-streak stain resistance of the coated metal sheet) becomes particularly satisfactory.

Here, the analysis of the composition on the surface of the coating film with XPS method (the amounts of Si atoms, F atoms, C atoms and O atoms) may be the same as a common analysis with XPS method using AlKα as an X-ray source, but for example, it can be carried out with the following measuring apparatus and measurement conditions.

(Measuring Apparatus and Measurement Conditions)

Measuring apparatus: scanning X-ray photoelectron spectroscopy apparatus, AXIS-NOVA manufactured by Kratos Analytical, Ltd.

X-ray source: AlKα (1,486.6 eV)

Analysis region: 700×300 μm

In addition, examples of the above-mentioned method for separating a $Si_{2p}$ spectrum into a peak corresponding to 103.5 eV and a peak corresponding to 102.7 eV include a method as described below. At first, the C1s peak top of the X-ray electron spectroscopic spectrum is corrected to be 285 eV. Subsequently, the $Si_2$ spectrum observed in the vicinity of 101 to 106 eV is subjected to background subtraction with Linear method. Then, the spectrum that has been subjected to the background subtraction is treated with a complex function of Gaussian function and Lorentz function, and the spectrum is separated into the peak of organic Si atoms (102.7 eV) and the peak of inorganic Si atoms (103.5 eV).

Note that, for coated metal sheet 100 according to the present invention, the methylene iodide sliding angle on the surface of coating film 2 surface is preferably 15° or more and 50° or less, and more preferably 35° or less. As mentioned above, coating film 2 of coated metal sheet 100 according to the present invention is subjected to a flame treatment (hydrophilization treatment), but when the hydrophilization treatment is insufficient, it is hard to obtain sufficient rain-streak satin resistance. Here, the methylene iodide sliding angle is increased when the surface of coating film 2 has high hydrophilicity or high roughness. However, it is increased excessively when the surface of coating film 2 has uneven hydrophilicity. For example, when the surface of coating film 2 is treated with a corona treatment, the methylene iodide sliding angle is greater than 50°. In contrast, when the surface of coating film 2 is subjected to a flame treatment, the surface is uniformly hydrophilized and the methylene iodide sliding angle is 50° or less.

Note that the reason why the methylene iodide sliding angle is greater than 50° when hydrophilicity of the surface of the coating film becomes uneven due to the corona discharge treatment or the like can be deduced as follows. Two coating films are assumed to be present as follows: both of the coating films have hydrophilic groups and hydrophobic groups in the same number on their respective surfaces, and one of the coating films has even distribution of hydrophilic groups and hydrophobic groups while the other has uneven distribution of hydrophilic groups and hydrophobic groups. The static contact angles of both coating films are generally the same as they are unlikely to be influenced by the distribution of hydrophilic groups and hydrophobic groups. In contrast, the dynamic contact angles (methylene iodide sliding angles) of both coating films are influenced by the distribution of hydrophilic groups and hydrophobic groups, and thus take different values. Upon the measurement of the methylene iodide sliding angle, if the distribution of hydrophilic groups and hydrophobic groups is uneven, a drop of methylene iodide is adsorbed to a portion having a high density of hydrophilic groups. That is, when the distribution of hydrophilic groups and hydrophobic groups is uneven, the drop of methylene iodide is less likely to move and the sliding angle thus becomes large, compared to the case where the distribution is even. The corona discharge treatment can introduce a large number of hydrophilic groups into the surface of the coating film, but the distribution thereof is uneven. Accordingly, in such a case, the methylene iodide sliding angle takes a high value greater than 50°.

Note that the methylene iodide sliding angle is a value measured as follows. First of all, 2 μl of methylene iodide is dropped on coating film 2. Subsequently, using a contact angle measuring apparatus, the inclination angle of coating film 2 (the angle between the plane perpendicular to the gravitational force and the coating film) is increased at the rate of 2 degrees/sec. Upon this, the drop of methylene iodide is observed with a camera attached to the contact angle measuring apparatus. Then, the inclination angle at the moment when the drop of methylene iodide starts falling is specified. This procedure is repeated 5 times, and the average value of five measurements is defined as the methylene iodide sliding angle of that coating film 2. Note that the moment when the drop of methylene iodide starts falling is defined as the moment when both of the bottom edge and the top edge of methylene iodide (the drop) in the gravity direction start moving.

Here, metal sheet 1 included in coated metal sheet 100 according to the present invention may be the same as the metal sheet described in the above-mentioned method for producing a coated metal sheet. Metal sheet 1 may have a chemical conversion film, an undercoat coating film or the like formed on its surface as long as it does not hinder the effects of the present invention. Furthermore, that metal sheet 1 may be subjected to a processing for forming irregularities such as embossing and drawing as long as it does not impair the effects of the present invention. In particular, metal sheet 1 is preferably a zinc plated steel sheet from the viewpoint of the balance between costs and long term durability.

Meanwhile, coating film 2 is not particularly limited as long as it contains: a cured product of a silicone resin as mentioned above; a fluorine-containing resin or its cured product (in the present specification, they are collectively referred to as a "fluorine-containing resin") as mentioned above; and the like, and as long as it satisfies the above-mentioned specifications. The cured product of a silicone resin may be the cured product of the silicone resin that the coating material contains, described in the above-mentioned method for producing a coated metal sheet. In addition, in particular, it is preferably a cured product of a silicone resin having a structure derived from methyltrialkoxysilane or phenyltrialkoxysilane. Methyl groups derived from methyltrialkoxysilane and phenyl groups derived from phenyltrialkoxysilane are likely to be removed upon the hydrophilization treatment (flame treatment) of the surface. Accordingly, when the cured product of the silicone resin has such a structure, hydrophilicity of the surface of coating film 2 is likely to be increased and the rain-streak stain resistance of coated metal sheet 100 is likely to be increased. Whether the cured product of the silicone resin that coating film 2 has a structure derived from methyltrialkoxysilane or phenyltrialkoxysilane or not can be specified by carrying out elemental analysis, structural analysis or the like of coating film 2.

In addition, the amount of the cured product of the silicone resin that coating film 2 contains is appropriately selected depending on the type of coated metal sheet 100 or the like, but it is preferably 1 to 10 parts by mass, more preferably 2 to 7 parts by mass, further preferably 2 to 6 parts by mass, and particularly preferably 3 to 6 parts by mass relative to 100 parts by mass of the total mass of coating film 2. When the amount of the cured product of the silicone resin that coating film 2 contains is in such a range, the proportion of Si atoms in the surface of coating film 2 can be increased sufficiently, thereby providing a coated metal sheet in which rain-streak stains are unlikely to occur. Moreover, in particular, when the amount of the cured product of the silicone resin is 1 part by mass or more, the above-mentioned content ratio of Si atoms, $Si_a$, upon measuring the coating film with XPS method is likely to be 8 atm % or more. On the other hand, when the content of the cured product of the silicone resin is 10 parts by mass or less, the coating film is unlikely to be excessively hard and the bending processability of coated metal sheet 100 is likely to be satisfactory.

Moreover, coating film 2 may contain a component other than the cured product of the silicone resin and the fluorine-containing resin, and may further contain inorganic particles, organic particles, a coloring pigment or the like. The above-described inorganic particles, organic particles, coloring pigment or the like may be the same as the components that the coating material contains described in the above-mentioned method for producing a coated metal sheet. Note that the amount of the fluorine-containing resin that coating film 2 contains is appropriately selected depending on an application of coated metal sheet 100 or the type of the resin, but the amount of the fluorine-containing resin is preferably 25 to 60 parts by mass and more preferably 30 to 50 parts by mass relative to the total mass of coating film 2 from the viewpoint of the strength of coating film 2 or the like.

On the other hand, the amount of inorganic particles and/or organic particles that coating film 2 contains is appropriately selected depending on the surface condition of coating film 2 or the like. Normally, the total amount of inorganic particles and organic particles may be 1 to 40 parts by mass relative to 100 parts by mass of the mass of coating film 2. Furthermore, the amount of the coloring pigment is preferably 20 to 60 parts by mass and more preferably 30 to 55 parts by mass relative to the total mass of coating film 2.

Moreover, the thickness of coating film 2 is appropriately selected depending on an application of coated metal sheet 100 and the like, but it is normally in the range of 3 to 30 μm. The thickness is a value determined through gravimetric method from the specific gravity of the baked coating film and the weight difference of coated metal sheet 100 before and after the removal of coating film 2 by sandblasting or the like. When coating film 2 is too thin, the durability and concealing properties of coating film 2 may be insufficient. On the other hand, when coating film 2 is too thick, production costs are increased and popping may easily occur during the baking.

EXAMPLES

Hereinafter, the present invention will be described in detail with reference to Examples; however, the present invention is not limited by these Examples.

1. Preparation of Coating materials Each coating material was prepared according to the following method.

1-1. Synthesis of Methyl-Based Silicone Resin 1

Into a 2-liter flask, 408 g (3.0 moles) of methyltrimethoxysilane was charged. Then, 800 g of water was added at 10° C. or lower and mixed well. Next, under ice cooling, 180 to 216 g (10.0 to 12.0 moles) of an aqueous 0.05 N hydrochloric acid solution was added dropwise at 5 to 25° C. over 20 to 40 minutes. After completion of the dropping, the mixture was stirred at 5 to 25° C. for 0.6 to 6 hours to complete hydrolysis and dehydrative condensation. As a result of this, prepared solutions containing seven methyl-based silicone resins A to G, each having a different content of silanol groups, were obtained. Note that the amount of silanol groups and the amount of structural units of methyl-based silicone resins A to G were adjusted through the above-described reaction time (stirring time) and reaction temperature, as well as the amount added of the aqueous hydrochloric acid solution.

Subsequently, from that prepared solution, methanol produced by the hydrolysis was distilled off under reduced pressure at 70° C. and 60 mmHg for 1 hour. The prepared solution after the distillation of methanol was clouded, and after leaving it at rest overnight, it was separated into 2 layers. The lower layer was a precipitated silicone resin that was insoluble in water. To that prepared solution, 469 g of methyl isobutyl ketone (MLBK) was added and the mixture was stirred at room temperature for 1 hour. As a result of this, the precipitated silicone resin was completely dissolved in MIBK. Then, the prepared solution was left at rest to be separated into the aqueous layer and the MIBK layer. Subsequently, the aqueous layer, which was the lower layer, was removed using a flask equipped with a cock to obtain a colorless and transparent silicone resin solution having a solid content of 50 mass %.

When the structure of obtained methyl-based silicone resin A was measured with $^{29}$Si-NMR, two broad signals were observed. Their chemical shifts were as follows: (1) δ=−54 to −58 ppm and (2) δ=−62 to −68 ppm. These chemical shifts are attributed to silicon atoms of $T_m$-2 unit and $T_m$-3 unit among $T_m$ units represented by the following formulas, respectively. That is, $T_m$-1 unit was not contained in methyl-based silicone resin A. In addition, when $^1$H-NMR analysis was carried out on methyl-based silicone resin A, it was found that all methoxy groups derived from methyltrimethoxysilane were hydrolyzed to become hydroxy groups.

[Formula 4]

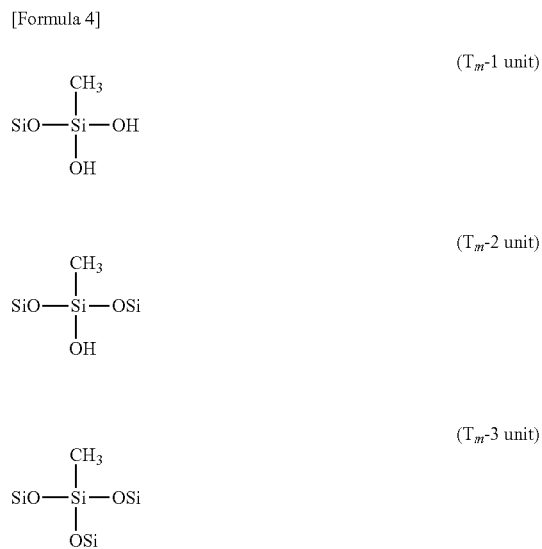

Furthermore, GPC analysis (in terms of polystyrene) was carried out under the following conditions to measure the weight average molecular weight Mw and the molecular weight distribution Mw/Mn of silicone resin A.

Measuring model: HLC-8320GPC manufactured by TOSOH CORPORATION

Columns: Shodex K-G+K-805L×2+K-800D

Eluent: chloroform

Temperature: column thermostat 40.0° C.

Flow rate: 1.0 mL/min

Concentration: 0.2 mass/volume %

Injection volume: 100 μl

Solubility: complete dissolution

Pretreatment: filtration with a 0.45 μm filter

Detector: differential refractometer (RI)

Similarly, for each of methyl-based silicone resins B to G, the structure was specified with $^{29}$Si-NMR and $^1$H-NMR analyses. In addition, the weight average molecular weight Mw and the molecular weight distribution Mw/Mn were measured with GPC analysis. Results of analysis for methyl-based silicone resins A to G are shown in Table 1 below.

TABLE 1

| Silicone resin | Weight average molecular weight | Molecular weight distribution (Mw/Mn) | T units/ D units | $T_m$ units | | | Amount of silanol groups relative to amount of Si atoms (mol %) |
| --- | --- | --- | --- | --- | --- | --- | --- |
| | | | | $T_m$-1 unit (mol %) | $T_m$-2 unit (mol %) | $T_m$-3 unit (mol %) | |
| A | 48000 | 7.2 | 100/0 | 0 | 8 | 92 | 8 |
| B | 2600 | 2.4 | 100/0 | 0 | 29 | 71 | 29 |
| C | 1400 | 1.7 | 100/0 | 0 | 38 | 62 | 38 |
| D | 790 | 1.4 | 100/0 | 0 | 48 | 52 | 48 |
| E | 51000 | 11.8 | 100/0 | 0 | 4 | 96 | 4 |
| F | 1300 | 1.3 | 100/0 | 0 | 52 | 48 | 52 |
| G | 680 | 1.1 | 100/0 | 0 | 24 | 76 | 24 |

1-2. Synthesis of Methyl-Based Silicone Resin 2

Into a 2-liter flask, 286 to 163 g (2.1 to 1.2 moles) of methyltrimethoxysilane and 108 to 216 g (0.9 to 1.8 moles) of dimethyldimethoxysilane were charged. Then, 800 g of water was added at 10° C. or lower and mixed well. Next, under ice cooling, 180 to 216 g (10.0 to 12.0 moles) of an aqueous 0.05 N hydrochloric acid solution was added dropwise at 5 to 25° C. over 20 to 40 minutes. After completion of the dropping, the mixture was stirred at 5 to 25° C. for 0.6 to 6 hours to carry out hydrolysis and dehydrative condensation. After completion of the dropping, the same operations were carried out as Synthesis of Methyl-Based Silicone Resin 1 to obtain silicone resin solutions containing three methyl-based silicone resins H to J having a solid content of about 50 mass %. Note that the amount of silanol groups and the amount of structural units of methyl-based silicone resins H to J were adjusted through the above-described reaction time (stirring time), reaction temperature, the amount added of the aqueous hydrochloric acid solution and the amount charged.

For each of obtained methyl-based silicone resins H to J, the structure was specified with $^2$Si-NMR and $^1$H-NMR analyses. Furthermore, the weight average molecular weight Mw and the molecular weight distribution Mw/Mn were measured with GPC analysis. Results of analysis for methyl-based silicone resins H to J are shown in Table 2 below. Note that Dm-1 unit and Dm-2 unit in Table 2 are structural units represented by the following formulas, respectively.

[Formula 5]

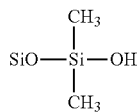

($D_m$-1 unit)

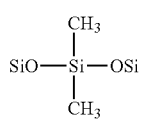

($D_m$-2 unit)

TABLE 2

| Silicone resin | Weight average molecular weight | Molecular weight distribution (Mw/Mn) | T units/ D units | $T_m$ units | | | $D_m$ unit | | Amount of silanol groups relative to amount of Si atoms (mol %) |
| --- | --- | --- | --- | --- | --- | --- | --- | --- | --- |
| | | | | $T_m$-1 unit (mol %) | $T_m$-2 unit (mol %) | $T_m$-3 unit (mol %) | $D_m$-1 unit (mol %) | $D_m$-2 unit (mol %) | |
| H | 2900 | 2.7 | 71/29 | 0 | 21 | 50 | 4 | 25 | 25 |
| I | 2400 | 1.9 | 55/45 | 0 | 19 | 36 | 9 | 36 | 28 |
| J | 2100 | 2.0 | 40/60 | 0 | 14 | 26 | 13 | 47 | 27 |

1-3. Synthesis of Methyl/Phenyl-Based Silicone Resin 3

Into a 2-liter flask, 326 to 41 g (2.4 to 0.3 moles) of methyltrimethoxysilane and 119 to 535 g (0.6 to 2.7 moles) of phenyltrimethoxysilane were charged. Then, 800 g of water was added at 10° C. or lower and mixed well. Next, under ice cooling, 180 to 216 g (10.0 to 12.0 moles) of an aqueous 0.05 N hydrochloric acid solution was added dropwise at 5 to 25° C. over 20 to 40 minutes. After completion of the dropping, the mixture was stirred at 5 to 25° C. for 0.6 to 6 hours to complete hydrolysis and dehydrative condensation. The same operations were carried out as Synthesis of Methyl-Based Silicone Resin 1 to obtain prepared solutions containing five methyl/phenyl-based silicone resins K to O having a solid content of about 50 mass %. Note that the amount of silanol groups and the amount of structural units of methyl/phenyl-based silicone resins K to O were adjusted through the above-described reaction time (stirring time), reaction temperature, the amount added of the aqueous hydrochloric acid solution and the amount charged.

For each of obtained methyl-based silicones K to O, the structure was specified with $^{29}$Si-NMR and $^{1}$H-NMR analyses. Note that, when the structure of methyl/phenyl-based silicone resin L was measured with $^{29}$Si-NMR, four broad Signals were observed. Their chemical shifts were as follows: (1) δ=−52 to −61 ppm, (2) δ=−62 to −71 ppm, (3) δ=−67 to −75 ppm and (4) δ=−75 to −83 ppm. These chemicals shifts are attributed to silicon atoms of $T_m$-2 unit, $T_m$-3 unit, $T_f$-2 unit and $T_f$-3 unit among $T_m$ units and $T_f$ units represented by the following formulas, respectively. In addition, when $^{1}$H-NMR analysis was carried out on methyl/phenyl-based silicone resin L, it was found that all methoxy groups derived from methyltrimethoxysilane and phenyltrimethoxysilane were hydrolyzed to become hydroxy groups. Furthermore, the weight average molecular weight Mw and the molecular weight distribution Mw/Mn were measured with GPC analysis. Results of analysis are shown in Table 3.

[Formula 6]

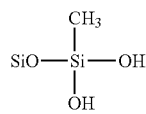

($T_m$-1 unit)

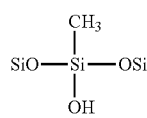

($T_m$-2 unit)

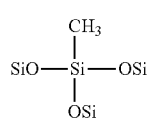

($T_m$-3 unit)

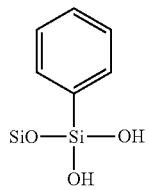

($T_f$-1 unit)

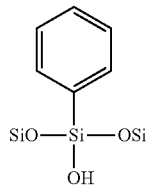

($T_f$-2 unit)

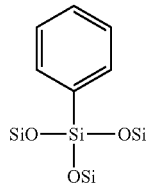

($T_f$-3 unit)

TABLE 3

| Silicone resin | Weight average molecular weight | Molecular weight distribution (Mw/Mn) | T units/ D units | Methyl/ phenyl | $T_m$ units | | | $T_f$ units | | | Amount of silanol groups relative to amount of Si atoms (mol %) |
|---|---|---|---|---|---|---|---|---|---|---|---|
| | | | | | $T_m$-1 unit (mol %) | $T_m$-2 unit (mol %) | $T_m$-3 unit (mol %) | $T_f$-1 unit (mol %) | $T_f$-2 unit (mol %) | $T_f$-3 unit (mol %) | |
| K | 2600 | 2.4 | 100/0 | 80/20 | 0 | 20 | 60 | 0 | 5 | 15 | 25 |
| L | 3100 | 2.9 | 100/0 | 66/34 | 0 | 18 | 48 | 0 | 9 | 25 | 27 |
| M | 2400 | 2.1 | 100/0 | 50/50 | 0 | 15 | 35 | 0 | 16 | 34 | 31 |
| N | 2600 | 1.8 | 100/0 | 20/80 | 0 | 5 | 15 | 0 | 21 | 59 | 26 |
| O | 3200 | 2.9 | 100/0 | 10/90 | 0 | 3 | 7 | 0 | 29 | 61 | 32 |

1-4. Synthesis of Methyl/Phenyl-Based Silicone Resin 4

Into a 2-liter flask, 109 to 27 g (0.8 to 0.2 moles) of methyltrimethoxysilane, 198 g (1.0 mole) of phenyltrimethoxysilane and 144 to 216 g (1.2 to 1.8 moles) of dimethyldimethoxysilane were charged. Then, 800 g of water was added at 10° C. or lower and mixed well. Next, under ice cooling, 180 to 216 g (10.0 to 12.0 moles) of an aqueous 0.05 N hydrochloric acid solution was added dropwise at 5 to 25° C. over 20 to 40 minutes, and the mixture was stirred at 5 to 25° C. for 0.6 to 6 hours to complete hydrolysis and dehydrative condensation. After completion of the dropping, the same operations were carried out as Synthesis of Methyl-Based Silicone Resin 1 to obtain silicone resin solutions containing three methyl/phenyl-based silicone resins P to R having a solid content of about 50 mass %. Note that the amount of silanol groups and the amount of structural units of methyl/phenyl-based silicone resins P to R were adjusted through the above-described reaction time (stirring time), reaction temperature, the amount added of the aqueous hydrochloric acid solution and the amount charged.

For each of obtained methyl-based silicones P to R, the structure was specified with $^{29}$Si-NMR and $^1$H-NMR analyses. Furthermore, the weight average molecular weight Mw and the molecular weight distribution Mw/Mn were measured with GPC analysis. Results of analysis are shown in Table 4.

silicate was added, triethyl orthoformate was added such that the amount thereof is 5 mass % relative to the total solid content of the coating material.

1-7. Arrangement of Metal Sheet

An A4-sized (210 mm×297 mm) hot-dip Zn-55% Al alloy-plated steel sheet having a sheet thickness of 0.27 mm and a per-side plating deposition amount of 90 g/m$^2$ was arranged as a metal sheet, and the surface thereof was alkali-degreased. Subsequently, an application-type chromate treatment liquid (NRC300NS, manufactured by Nippon Paint Co., Ltd.) was applied on the surface of the metal sheet such that the Cr deposition amount was 50 mg/m$^2$. Furthermore, an epoxy resin-based primer coating material

TABLE 4

| Silicone resin | Weight average molecular weight | Molecular weight distribution (Mw/Mn) | T units/ D units | Methyl/ phenyl | $T_m$ units | | | $T_f$ units | | | D units | | Amount of silanol groups relative to amount of Si atoms (mol %) |
| | | | | | $T_m$-1 unit (mol %) | $T_m$-2 unit (mol %) | $T_m$-3 unit (mol %) | $T_f$-1 unit (mol %) | $T_f$-2 unit (mol %) | $T_f$-3 unit (mol%) | $D_m$-1 unit (mol %) | $D_m$-2 unit (mol %) | |
|---|---|---|---|---|---|---|---|---|---|---|---|---|---|
| P | 4200 | 3.1 | 60/40 | 66/34 | 0 | 11 | 15 | 0 | 14 | 20 | 0 | 40 | 25 |
| Q | 3900 | 3.1 | 50/50 | 66/34 | 0 | 8 | 8 | 0 | 18 | 16 | 0 | 50 | 28 |
| R | 3300 | 2.7 | 40/60 | 66/34 | 0 | 3 | 3 | 0 | 21 | 13 | 0 | 60 | 28 |

1-5. Arrangement of Methyl Silicate and Ethyl Silicate

For methyl silicate and ethyl silicate, the following commercial products were used.

[Methyl Silicate S]

Methyl silicate 53A (manufactured by Colcoat Co., Ltd., condensate of tetramethoxysilane) weight average molecular weight (Mw): 840, number average molecular weight (Mn): 610, Mw/Mn=1.4

[Ethyl Silicate T]

Ethyl silicate 48 (manufactured by Colcoat Co., Ltd., condensate of tetraethoxysilane) weight average molecular weight (Mw): 1,300, number average molecular weight (Mn): 850, Mw/Mn=1.5

1-6. Preparation of Coating Materials

By mixing a polyvinylidene fluoride resin (manufactured by Pennwalt Japan Ltd., product name: Kynar 500, weight average molecular weight 650,000, melting point 160 to 165° C.) and an acrylic resin (thermoplastic, polymerized product of methyl (meth)acrylate), a composition containing a fluorine-containing resin that serves as a base was obtained. The blend ratio of the polyvinylidene fluoride resin and the acrylic resin was 70/30 (mass ratio).

To the composition described above, 1 mass % of dodecylbenzenesulfonic acid was added as a catalyst, relative to the solid content of the composition described above, and furthermore, dimethylaminoethanol was added. Note that the amount added of dimethylaminoethanol was such that the amine equivalent thereof is 1.25 times the acid equivalent of dodecylbenzenesulfonic acid.

Furthermore, as shown in Table 5 and Table 6, each of the above-mentioned methyl-based silicone resins, methyl/phenyl-based silicone resins, methyl silicate or ethyl silicate was added such that the amount thereof is 5 mass % relative to the total solid content of the coating material. In addition, for the coating material to which methyl silicate or ethyl (800P, manufactured by Nippon Fine Coatings Inc.) was applied using a roll coater such that the thickness of the cured film was 5 μm. Subsequently, the resultant sheet was baked such that the highest temperature that the base sheet reached was 215° C., thereby obtaining a plated steel sheet having a primer coating film formed thereon (hereinafter, also simply referred to as a "plated steel sheet").

2. Production of Coated Metal Sheet (1)

In each of Examples 1 to 16 and Comparative Examples 1, 2, 11 and 12, a coated metal sheet was obtained by carrying out the following coating film formation and flame treatment. In addition, in each of Comparative Examples 6 to 8, a coated metal sheet was obtained by carrying out the following coating film formation and corona discharge treatment. On the other hand, in each of Comparative Examples 3 to 5, 9 and 10, a coated metal sheet was obtained by carrying out the following coating film formation only.

2-1. Coating Film Formation

Each coating material shown in Table 5 and Table 6 was applied to the above-mentioned plated steel sheet using a roll coater such that the thickness of the cured film was 20 μm, and was baked for 60 seconds such that the highest temperature that the sheet reached was 260° C. and the wind velocity on the sheet surface was 0.9 m/s. Note that, in order to confirm stability of the coating material, each coating material was applied 24 hours after its preparation.

2-2. Flame Treatment (Examples 1 to 16 and Comparative Examples 1, 2, 11 and 12)

The coating film formed in the above-described coating film formation was subjected to a flame treatment. As a burner for flame treatment, F-3000 manufactured by Flynn Burner Corporation (USA) was used. As a combustible gas, a mixed gas obtained by mixing LP gas (combustion gas) and clean dry air (LP gas:clean dry air (volume ratio)=1:25) using a gas mixer was used. In addition, the flow rate of each gas was adjusted such that, for 1 cm² of a burner port of the burner, the flow rate of the LP gas (combustion gas) was 1.67 L/min and the flow rate of the clean dry air was 41.7 L/min. The length (a length represented by L in FIG. 1A) of the burner port of the burner head in the conveyance direction of a coating film was set to be 4 mm. The length (a length represented by W in FIG. 1B) of the burner port of the burner head in the direction perpendicular to the conveyance direction was set to be 450 mm. Furthermore, the distance between the burner port of the burner head and the surface of the coating film was set to be 50 mm depending on an amount desired of flame treatment. Moreover, the conveyance speed of the coating film was set to be 30 m/min, thereby adjusting the amount of flame treatment to be 212 kJ/m².

2-3. Corona Discharge Treatment (Comparative Examples 6 to 8)

For a corona discharge treatment, a corona discharge treatment apparatus manufactured by Kasuga Denki, Inc. having the following specifications was used.

(Specifications)

Electrode: ceramic electrode

Length of electrode: 430 mm

Output: 310 W

In addition, each coating film was subjected to the corona discharge treatment once. The amount of corona discharge treatment was adjusted through the treatment speed. Specifically, the treatment was carried out at 3.8 m/min, thereby setting the amount of corona discharge treatment to be 200 W-min/m².

3. Tests (1)

For coated metal sheets made in Examples and Comparative Examples, or test pieces made by using coating materials used in Examples and Comparative Examples, the following tests were carried out. Results are shown in Table 5 and Table 6.

(1) Amount of Silicone Resin or Silicate Evaporated

By applying each of the coating materials used in Examples and Comparative Examples to the surface of an aluminum sheet (JIS A5052) having a thickness of 0.5 mm such that the film thickness was 18 μm, a coating film was formed. Then, the coated aluminum sheet having the coating film formed thereon was cut into a 10 cm×10 cm square, which was dissolved in a mixed acid solution of hydrofluoric acid, hydrochloric acid and nitric acid, and was further thermolyzed by irradiating it with microwave. Subsequently, by diluting the solution with ultrapure water to a certain volume, a test liquid was prepared. Using an ICP-AES analyzing apparatus (ICPE-9820 model) manufactured by Shimadzu Corporation, Si atoms in that test liquid was analyzed quantitatively.

Meanwhile, a coating material was prepared in the same manner as Examples and Comparative Examples except that the silicone resin or silicate was not added, and that coating material was used to form a coating film. Then, as described above, Si atoms in the test liquid was analyzed quantitatively.

By comparing these results, the amount of Si atoms derived from a silicone resin or silicate in each coating film was determined. In addition, the amount of Si atoms in the coating film was determined by calculation in the case where a silicone resin or silicate was not evaporated at all. Then, by comparing the amount of Si atoms in the case where no evaporation occurred and the amount of Si atoms in each of the coating films made in Examples or Comparative Examples, the amount of a silicone resin or silicate evaporated upon formation of the coating film was evaluated on the basis of the following criteria.

D: amount evaporated of 20% or more

C: 10% or more and less than 20%

B: 3% or more and less than 10%

A: less than 3%

Note that C, B and A were evaluated as passing.

(2) Evaluation on Storage Stability of Coating Materials

Coating materials used in Examples and Comparative Examples were stored in a thermostatic chamber at 40° C., and the viscosity of each coating material after 15 days was measured with a B-type viscometer. Then, by comparing viscosities before and after the storage, evaluation was carried out on the basis of the following criteria.

D: gelated in 15 days after being left in thermostatic chamber

C: rising rate of coating material viscosity is 100% or more before and after storage in thermostatic chamber B: rising rate of coating material viscosity is 30% or more and less than 100% before and after storage in thermostatic chamber A: rising rate of coating material viscosity is less than 30% before and after storage in thermostatic chamber Note that C, B and A were evaluated as passing.

(3) Measurement of Water Contact Angle

The water contact angle was measured for the surface of the coating film of the coated metal sheet made in each of Examples and Comparative Examples. The measurement was carried out by forming a 0.01 cc droplet of purified water in a thermostat and humidistat chamber at an atmospheric temperature of 23±2° C. and a relative humidity of 50±5%, and using a contact angle measuring device DM901 manufactured by Kyowa Interface Science, Inc.

(4) Evaluation of Rain-Streak Stain Resistance

The rain-streak stain resistance was evaluated as follows.

Each of the coated metal sheets made in Examples and Comparative Examples was attached to a vertical exposure board. Above the coated metal sheet, a corrugated sheet was further attached at an angle of 200 relative to the ground. Upon this, the corrugated sheet was installed such that rainwater ran down the surface of the coated metal sheet as streaks. In this state, an outdoor exposure test was carried out for 6 months, and the state of stain adhesion was then observed. The rain-streak stain resistance was evaluated using brightness difference (ΔL) of the coated metal sheet before and after the exposure as follows.

D: ΔL was 2 or more (stains were noticeable)

C: ΔL was 1 or more and less than 2 (rain-streak stains were not noticeable, but visible)

B: ΔL was less than 1 (rain-streak stains were hardly visible)

A: ΔL was less than 1 and no rain-streak stain was visible

Note that C, B and A were evaluated as passing.

TABLE 5

| | No. | Type of hydrophilizing agent | Symbol | Methyl/phenyl ratio | T units/D units ratio | Amount of silanol groups relative to amount of Si atoms (mol %) | Molecular weight Mw | Molecular weight Mw/Mn | Evaluation of evaporating properties | Surface treatment method | Storage stability of coating material | Water contact angle (°) | Evaluation of rain-streak stain resistance |
|---|---|---|---|---|---|---|---|---|---|---|---|---|---|
| Example | 1 | Methyl-based silicone resin | A | 100/0 | 100/0 | 8 | 48,000 | 7.2 | A | Flame | C | 58 | C |
| | 2 | | B | 100/0 | 100/0 | 29 | 2,600 | 2.4 | A | Flame | B | 29 | A |
| | 3 | | C | 100/0 | 100/0 | 38 | 1,400 | 1.7 | B | Flame | B | 21 | A |
| | 4 | | D | 100/0 | 100/0 | 48 | 790 | 1.4 | B | Flame | C | 36 | B |
| | 5 | | G | 100/0 | 100/0 | 24 | 680 | 1.1 | C | Flame | B | 25 | A |
| | 6 | | H | 100/0 | 71/29 | 25 | 2,900 | 2.7 | A | Flame | B | 28 | A |
| | 7 | | I | 100/0 | 55/45 | 28 | 2,400 | 1.9 | A | Flame | B | 36 | B |
| | 8 | | J | 100/0 | 40/60 | 27 | 2,100 | 2.0 | A | Flame | B | 48 | C |
| | 9 | Methyl/phenyl-based silicone resin | K | 80/20 | 100/0 | 25 | 2,600 | 2.4 | A | Flame | A | 22 | A |
| | 10 | | L | 66/34 | 100/0 | 27 | 3,100 | 2.9 | A | Flame | A | 25 | A |
| | 11 | | M | 50/50 | 100/0 | 31 | 2,400 | 2.1 | A | Flame | A | 25 | A |
| | 12 | | N | 20/80 | 100/0 | 26 | 2,600 | 1.8 | A | Flame | A | 22 | A |
| | 13 | | O | 10/90 | 100/0 | 32 | 3,200 | 2.9 | A | Flame | A | 28 | A |
| | 14 | | P | 66/34 | 60/40 | 25 | 4,200 | 3.1 | A | Flame | A | 29 | A |
| | 15 | | Q | 66/34 | 50/50 | 28 | 3,900 | 3.1 | A | Flame | A | 37 | B |
| | 16 | | R | 66/34 | 40/60 | 28 | 3,300 | 2.7 | A | Flame | A | 46 | C |

TABLE 6

| | No. | Type of hydrophilizing agent | Symbol | Methyl/phenyl ratio | T units/D units ratio | Amount of silanol group relative to amount of Si atoms (mol %) | Molecular weight Mw | Molecular weight Mw/Mn | Evaluation of evaporating properties | Surface treatment method | Storage stabilty of coating material | Water contact angle (°) | Evaluation of rain-streak stain resistance |
|---|---|---|---|---|---|---|---|---|---|---|---|---|---|
| Comparative Examples | 1 | Methyl-based silicone resin | E | 100/0 | 100/0 | 4 | 51,000 | 11.8 | A | Flame | D | 63 | D |
| | 2 | | F | 100/0 | 100/0 | 52 | 1,300 | 1.3 | B | Flame | D | 50 | D |
| | 3 | | B | 100/0 | 100/0 | 29 | 2,600 | 2.4 | A | Untreated | B | 86 | D |
| | 4 | Methyl/phenyl-based silicone resin | L | 66/34 | 100/0 | 27 | 3,100 | 2.9 | A | Untreated | A | 87 | D |
| | 5 | | P | 66/34 | 60/40 | 25 | 4,200 | 3.1 | A | Untreated | A | 87 | D |
| | 6 | Methyl-based silicone resin | B | 100/0 | 100/0 | 29 | 2,600 | 2.4 | A | Corona discharge | B | 65 | D |
| | 7 | Methyl/phenyl-based silicone resin | L | 66/34 | 100/0 | 27 | 3,100 | 2.9 | A | Corona discharge | A | 65 | D |
| | 8 | | P | 66/34 | 60/40 | 25 | 4,200 | 3.1 | A | Corona discharge | A | 60 | D |
| | 9 | Methyl silicate | S | — | — | — | 840 | 1.4 | D | Untreated | D | 88 | D |
| | 10 | Ethyl silicate | T | — | — | — | 1,300 | 1.5 | D | Untreated | D | 85 | D |
| | 11 | Methyl silicate | S | — | — | — | 840 | 1.4 | D | Flame | D | 72 | D |
| | 12 | Ethyl silicate | T | — | — | — | 1,300 | 1.5 | D | Flame | D | 45 | B |

As shown in Table 5 and Table 6, even when a coating film was formed using a silicone resin-containing coating material, only this did not lead to improvement. For any of the silicone resins, the water contact angle of the coating film was high and the rain-streak stain resistance of the coated metal sheet was bad (Comparative Examples 3 to 5). In addition, even when the corona discharge treatment was carried out after the coating film formation, the water contact angle was high and the rain-streak stain resistance was insufficient (Comparative Examples 6 to 8). It is assumed that it was difficult for the corona discharge treatment to uniformly carry out the hydrophilization treatment.

In contrast, for each coated metal sheet obtained by forming a coating film with a silicone resin-containing coating material in which the amount (number of moles) of silanol groups is 5 to 50 mol % relative to the amount (number of moles) of Si atoms, and by carrying out the flame treatment, the water contact angle was sufficiently low and the rain-streak stain resistance was at a passing level (Examples 1 to 16). The silicone resin containing silanol groups in an amount in the range described above is likely to be enriched uniformly on the surface of the coating film. In addition, although phenyl groups bonded to Si atoms are, in general, unlikely to be removed by a common surface treatment (for example, corona discharge treatment) (for example, Comparative Examples 7 and 8), the flame treatment can remove not only methyl groups but also phenyl groups, and it can introduce silanol groups or the like to the surface of the coating film (for example, Examples 9 to 16). Moreover, the flame treatment was able to uniformly hydrophilize the surface of the coating film.

Furthermore, in silicone resin-containing coating materials, the evaluation of evaporating properties was satisfactory. That is, the silicone resin was unlikely to be evaporated upon curing the coating material and the coating film was unlikely to be fouled with silica or the like adhering to the heating apparatus, and therefore, coated metal sheets having a satisfactory appearance were obtained.

On the other hand, in the case where a coating material containing a silicone resin in which the amount of silanol groups are too small (less than 5 mol %) was used to form a coating film, even when the flame treatment was carried out, the rain-streak stain resistance was insufficient (Comparative Example 1). When the amount of silanol groups is less than 5 mol %, the molecular weight of the silicone resin tends to become larger, and the silicone resin is polymerized through some degree of reaction. Therefore, the silicone resin is unlikely to be enriched uniformly on the surface and is likely to be in the form of sea-island. As a result, it is assumed that even when the flame treatment was carried out, the surface of the coated metal sheet was not hydrophilized uniformly and the rain-streak stain resistance was not enhanced sufficiently.

In contrast, in the case where a coating material containing a silicone resin in which the amount of silanol groups are excessive (greater than 50 mol %) was used to form a coating film, the rain-streak stain resistance was not enhanced sufficiently (Comparative Example 2). When the amount of silanol groups is excessive, it is believed that if the time interval between preparation of the coating material and application thereof was long, the silicone resin underwent reaction and it was difficult to uniformly hydrophilize the surface of the coated metal sheet.

In addition, for coating materials containing organosilicate such as methyl silicate or ethyl silicate, the storage stability was not sufficient and the coating materials were likely to be evaporated upon curing coating films (Comparative Examples 9 to 12). Furthermore, in coated metal sheets made by using a coating material containing methyl silicate, even when the flame treatment was carried out, the rain-streak stain resistance was low (Comparative Example 11). It is assumed that, in that coating material, methyl silicate was not likely to be enriched on the surface of the film upon the application, and methyl silicate was evaporated as well upon curing the film.

4. Preparation of Coating Materials (2)

Each coating material was prepared according to the following method.

4-1. Synthesis of Methyl-Based Silicone Resin U

Into a 2-liter flask, 408 g (3.0 moles) of methyltrimethoxysilane was charged. Then, 800 g of water was added at 10° C. or lower and mixed well. Next, under ice cooling, 216 g (12.0 moles) of an aqueous 0.05 N hydrochloric acid solution was added dropwise at 5° C. over 40 minutes. After completion of the dropping, the mixture was stirred at 10° C. for 6 hours to complete hydrolysis and dehydrative condensation. As a result of this, a prepared solution containing methyl-based silicone resin U was obtained.

Subsequently, from that prepared solution, methanol produced by the hydrolysis was distilled off under reduced pressure at 70° C. and 60 mmHg for 1 hour. The prepared solution after the distillation of methanol was clouded, and after leaving it at rest overnight, it was separated into 2 layers. The lower layer was a precipitated silicone resin that was insoluble in water. To that prepared solution, 469 g of methyl isobutyl ketone (MIBK) was added and the mixture was stirred at room temperature for 1 hour. As a result of this, the precipitated silicone resin was completely dissolved in MIBK. Then, the prepared solution was left at rest to be separated into the aqueous layer and the MIBK layer. Subsequently, the aqueous layer, which was the lower layer, was removed using a flask equipped with a cock to obtain a colorless and transparent silicone resin solution having a solid content of 50 mass %.

When the structure of obtained methyl-based silicone resin U was measured with $^{29}$Si-NMR, two broad signals were observed. Their chemical shifts were as follows: (1) δ=−54 to −58 ppm and (2) δ=−62 to −68 ppm. These chemical shifts are attributed to silicon atoms of $T_m$-2 unit and $T_m$-3 unit among $T_m$ units represented by the following formulas, respectively. That is, $T_m$-1 unit was not contained in methyl-based silicone resin U. In addition, when $^1$H-NMR analysis was carried out on methyl-based silicone resin U, it was found that all methoxy groups derived from methyltrimethoxysilane were hydrolyzed to become hydroxy groups.

[Formula 7]

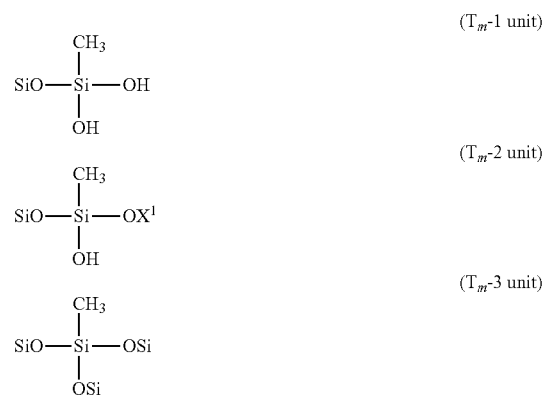

Furthermore, GPC analysis (in terms of polystyrene) was carried out under the following conditions to measure the weight average molecular weight Mw and the molecular weight distribution Mw/Mn of silicone resin U. Results are shown in Table 7.

Measuring model: HLC-8320GPC manufactured by TOSOH CORPORATION
Columns: Shodex K-G+K-805L×2+K-800D
Eluent: chloroform
Temperature: column thermostat 40.0° C.
Flow rate: 1.0 mL/min
Concentration: 0.2 mass/volume %

Injection volume: 100 μl
Solubility complete dissolution
Pretreatment: filtration with a 0.45 μm filter
Detector: differential refractometer (RI)

4-2. Synthesis of Methyl-Based Silicone Resin V

Into a 2-liter flask, 286 g (2.1 moles) of methyltrimethoxysilane and 108 g (0.9 moles) of dimethyldimethoxysilane were charged. Then, 800 g of water was added at 10° C. or lower and mixed well. Next, under ice cooling, 198 g (11.0 moles) of an aqueous 0.05 N hydrochloric acid solution was added dropwise at 5 to 25° C. over 20 minutes. After completion of the dropping, the mixture was stirred at 15° C. for 6 hours to carry out hydrolysis and dehydrative condensation. After completion of the dropping, the same operations were carried out as Synthesis of Methyl-Based Silicone Resin U to obtain a silicone resin solution containing methyl-based silicone resin V having a solid content of about 50 mass %.

For obtained methyl-based silicone resin V, the structure was specified with $^{29}$Si-NMR and $^1$H-NMR analyses. Furthermore, the weight average molecular weight Mw and the molecular weight distribution Mw/Mn were measured with GPC analysis. Results of analysis for methyl-based silicone V are shown in Table 7. Note that Dm-1 unit and Dm-2 unit in Table 7 are structural units represented by the following formulas, respectively.

[Formula 8]

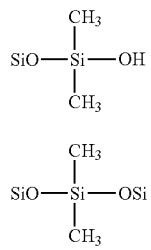

($D_m$-1 unit)

($D_m$-2 unit)

obtain a prepared solution containing methyl/phenyl-based silicone resin W having a solid content of about 50 mass %.

For obtained methyl/phenyl-based silicone resin W, the structure was specified with $^{29}$Si-NMR and $^1$H-NMR analyses. Note that, when the structure of methyl/phenyl-based silicone resin W was measured with $^{29}$Si-NMR, four broad signals were observed. Their chemical shifts were as follows: (1) S=−52 to −61 ppm, (2) S=−62 to −71 ppm, (3) S=−67 to −75 ppm and (4) δ=−75 to −83 ppm. These chemicals shifts are attributed to silicon atoms of $T_m$-2 unit, $T_m$-3 unit, $T_f$-2 unit and $T_f$-3 unit among $T_m$ units and $T_f$ units represented by the following formulas, respectively. In addition, when $^1$H-NMR analysis was carried out on methyl/phenyl-based silicone resin W, it was found that all methoxy groups derived from methyltrimethoxysilane and phenyltrimethoxysilane were hydrolyzed to become hydroxy groups. Furthermore, the weight average molecular weight Mw and the molecular weight distribution Mw/Mn were measured with GPC analysis. Results of analysis are shown in Table 8.

[Formula 9]

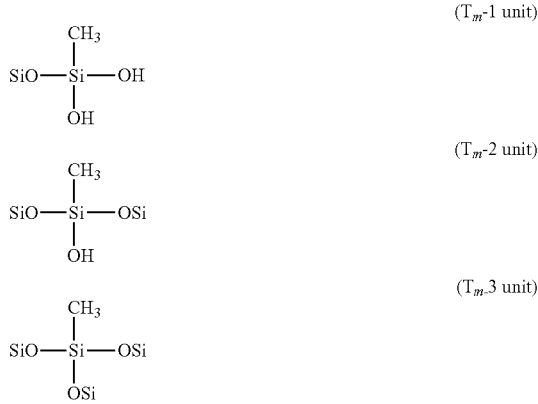

TABLE 7

| Silicone resin | Weight average molecular weight | Molecular weight distribution (Mw/Mn) | T units/ D units | $T_m$ units | | | $D_m$ units | | Amount of silanol groups relative to amount of Si atoms (mol %) |
|---|---|---|---|---|---|---|---|---|---|
| | | | | $T_m$-1 unit (mol %) | $T_m$-2 unit (mol %) | $T_m$-3 unit (mol %) | $D_m$-1 unit (mol %) | $D_m$-2 unit (mol %) | |
| U | 2600 | 2.4 | 100/0 | 0 | 29 | 71 | — | — | 29 |
| V | 2900 | 2.7 | 71/29 | 0 | 21 | 50 | 4 | 25 | 25 |

4-3. Synthesis of Methyl/Phenyl-Based Silicone Resin W

Into a 2-liter flask, 272 g (2.0 moles) of methyltrimethoxysilane and 119 g (1.0 mole) of phenyltrimethoxysilane were charged. Then, 800 g of water was added at 10° C. or lower and mixed well. Next, under ice cooling, 198 g (11.0 moles) of an aqueous 0.05 N hydrochloric acid solution was added dropwise at 5 to 25° C. over 30 minutes. After completion of the dropping, the mixture was stirred at 10° C. for 6 hours to complete hydrolysis and dehydrative condensation. After completion of the dropping, the same operations were carried out as Synthesis of Methyl-Based Silicone Resin U to -continued

($T_f$-1 unit)

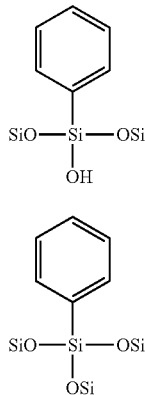

($T_f$-2 unit)

($T_f$-3 unit)

4-4. Synthesis of Methyl/Phenyl-Based Silicone Resin X

Into a 2-liter flask, 109 g (0.8 moles) of methyltrimethoxysilane, 198 g (1.0 mole) of phenyltrimethoxysilane and 144 g (1.2 moles) of dimethyldimethoxysilane were charged. Then, 800 g of water was added at 10° C. or lower and mixed well. Next, under ice cooling, 216 g (12.0 moles) of an aqueous 0.05 N hydrochloric acid solution was added dropwise at 5 to 25° C. over 40 minutes, and the mixture was stirred at 10° C. for 6 hours to complete hydrolysis and dehydrative condensation. After completion of the dropping, the same operations were carried out as Synthesis of Methyl-Based Silicone Resin U to obtain a silicone resin solution containing methyl/phenyl-based silicone resin X having a solid content of about 50 mass %.

For obtained methyl/phenyl-based silicone resin X, the structure was specified with $^{29}$Si-NMR and $^1$H-NMR analyses. Furthermore, the weight average molecular weight Mw and the molecular weight distribution Mw/Mn were measured with GPC analysis. Results of analysis are shown in Table 8.

4-6. Preparation of Coating materials

By mixing a polyvinylidene fluoride resin (manufactured by Pennwalt Japan Ltd., product name: Kynar 500, weight average molecular weight 650,000, melting point 160 to 165° C.) and an acrylic resin (thermoplastic, polymerized product of methyl (meth)acrylate), a composition containing a fluorine-containing resin that serves as a base was obtained. The blend ratio of the polyvinylidene fluoride resin and the acrylic resin was 70/30 (mass ratio).

To the composition described above, 1 mass % of dodecylbenzenesulfonic acid was added as a catalyst, relative to the solid content of the composition described above. Furthermore, dimethylaminoethanol was added. Note that the amount added of dimethylaminoethanol was such that the amine equivalent thereof is 1.25 times the acid equivalent of dodecylbenzenesulfonic acid.

Furthermore, each of the above-mentioned methyl-based silicone resins, methyl/phenyl-based silicone resins, methyl silicate or ethyl silicate was added such that the amount thereof follows the proportion shown in Table 9 relative to the total solid content of the coating material. Those coating materials were stored at 20 to 30° C. for 15 days. In addition, for the coating material to which methyl silicate Y or ethyl silicate Z was added, triethyl orthoformate was added as a dehydrating agent upon preparation of the coating material such that the amount thereof is 5 mass % relative to the total solid content of the coating material.

4-7. Arrangement of Metal Sheet

An A4-sized (210 mm×297 mm) hot-dip Zn-55% Al alloy-plated steel sheet having a sheet thickness of 0.27 mm and a per-side plating deposition amount of 90 g/m² was arranged as a metal sheet, and the surface thereof was alkali-degreased. Subsequently, an application-type chromate treatment liquid (NRC300NS, manufactured by Nippon Paint Co., Ltd.) was applied on the surface of the metal sheet such that the Cr deposition amount was 50 mg/m². Furthermore, an epoxy resin-based primer coating material (800P, manufactured by Nippon Fine Coatings Inc.) was

TABLE 8

| Silicone resin | Weight average molecular weight | Molecular weight distribution (Mw/Mn) | T units/ D units | Methyl/ phenyl | $T_m$ units | | | $T_f$ units | | | D units | | Amount of silanol groups relative to amount of Si atoms (mol %) |
| | | | | | $T_m$-1 unit (mol %) | $T_m$-2 unit (mol %) | $T_m$-3 unit (mel %) | $T_f$-1 unit (mol %) | $T_f$-2 unit (mol %) | $T_f$-3 unit (mol %) | $D_m$-1 unit (mol %) | $D_m$-2 unit (mol %) | |
| --- | --- | --- | --- | --- | --- | --- | --- | --- | --- | --- | --- | --- | --- |
| W | 3100 | 2.9 | 100/0 | 66/34 | 0 | 18 | 48 | 0 | 9 | 25 | 0 | 0 | 27 |
| X | 4200 | 3.1 | 60/40 | 66/34 | 0 | 11 | 15 | 0 | 14 | 20 | 0 | 40 | 25 |

4-5. Arrangement of Methyl Silicate and Ethyl Silicate

For methyl silicate Y and ethyl silicate Z, the following commercial products were used.

[Methyl Silicate Y]

Methyl silicate 53A (manufactured by Colcoat Co., Ltd., condensate of tetramethoxysilane) weight average molecular weight (Mw): 840, number average molecular weight (Mn): 610, Mw/Mn=1.4

[Ethyl Silicate Z]

Ethyl silicate 48 (manufactured by Colcoat Co., Ltd., condensate of tetraethoxysilane) weight average molecular weight (Mw): 1,300, number average molecular weight (Mn): 850, Mw/Mn=1.5 applied using a roll coater such that the thickness of the cured film was 5 μm. Subsequently, the resultant sheet was baked such that the highest temperature that the base sheet reached was 215° C., thereby obtaining a plated steel sheet having a primer coating film formed thereon (hereinafter, also simply referred to as a "plated steel sheet").

5. Production of Coated Metal Sheet (2)

In each of Examples 17 to 26 and Comparative Examples 13, 16, 21 and 22, a coated metal sheet was obtained by carrying out the following coating film formation and flame treatment. On the other hand, in each of Comparative Examples 14, 15 and 17 to 20, a coated metal sheet was obtained by carrying out the following coating film formation only.

5-1. Coating Film Formation

Each of the coating materials shown in Table 9 (all of which are coating materials that have been stored for 15 days since their preparation) was applied to the above-mentioned plated steel sheet using a roll coater such that the thickness of the cured film was 20 μm, and was baked for 60 seconds such that the highest temperature that the sheet reached was 260° C. and the wind velocity on the sheet surface was 0.9 m/s.

5-2. Flame Treatment (Examples 17 to 26 and Comparative Examples 13, 16, 21 and 22)

The coating film formed in the above-described coating film formation was subjected to a flame treatment. As a burner for flame treatment, F-3000 manufactured by Flynn Burner Corporation (USA) was used. As a combustible gas, a mixed gas obtained by mixing LP gas (combustion gas) and clean dry air (LP gas:clean dry air (volume ratio)=1:25) using a gas mixer was used. In addition, the flow rate of each gas was adjusted such that, for 1 cm$^2$ of a burner port of the burner, the flow rate of the LP gas (combustion gas) was 1.67 L/min and the flow rate of the clean dry air was 41.7 L/min. The length (a length represented by L in FIG. 1A) of the burner port of the burner head in the conveyance direction of a coating film was set to be 4 mm. The length (a length represented by W in FIG. 1B) of the burner port of the burner head in the direction perpendicular to the conveyance direction was set to be 450 mm. Furthermore, the distance between the burner port of the burner head and the surface of the coating film was set to be 50 mm depending on an amount desired of flame treatment. Moreover, the conveyance speed of the coating film was set to be 20 m/min, thereby adjusting the amount of flame treatment to be 319 kJ/m$^2$.

6. Tests (2)

For coated metal sheets made in Examples and Comparative Examples, or test pieces made by using coating materials used in Examples and Comparative Examples, the following measurements and evaluations were carried out. Results are shown in Table 9.

(1) XPS Measurement

XPS measurement was carried out for the surface of the coating film with a scanning X-ray photoelectron spectroscopy apparatus, AXIS-NOVA manufactured by Kratos Analytical, Ltd. Then, both $Si_a$ and x were specified, wherein $Si_a$ is the proportion of Si atoms based on the amount of Si atoms, F atoms, C atoms and O atoms in the surface of the coating film, and x is the ratio of the amount of O atoms to the amount of C atoms in the surface of the coating film. In addition, the C1s peak top in the obtained X-ray photoelectron spectroscopic spectrum was corrected to be 285 eV, and the $Si_2$ spectrum was separated into a peak corresponding to 103.5 eV and a peak corresponding to 102.7 eV. Then, y was also calculated wherein y is the ratio of the peak area of 103.5 eV to the peak area of the entire $Si_2$ spectrum. Note that measurement conditions upon the XPS measurement were as follows. Moreover, the $Si_2$ spectrum was subjected to background subtraction with Linear method and then treated with a complex function of Gaussian function and Lorentz function, thereby separating the spectrum into the peak of organic Si atoms (102.7 eV) and the peak of inorganic Si atoms (103.5 eV).

(Measurement Conditions)

X-ray source: AlKα (1,486.6 eV)

Analysis region: 700×300 μm (2) Measurement of Methylene Iodide Sliding Angle

On a coating film that was held horizontally, 2 μl of methylene iodide was dropped. Subsequently, using a contact angle measuring apparatus (DM901, manufactured by Kyowa Interface Science, Inc.), the inclination angle of the coating film (the angle between the horizontal plane and the coating film) was increased at the rate of 2 degrees/sec. Upon this, the drop of methylene iodide was observed with a camera attached to the contact angle measuring apparatus. Then, the inclination angle at the moment when the drop of methylene iodide starts falling was specified. This procedure was repeated 5 times, and the average value of five measurements was defined as the methylene iodide sliding angle of that coating film. Note that the moment when the drop of methylene iodide starts falling was defined as the moment when both of the bottom edge and the top edge of the drop of methylene iodide in the gravity direction start moving.

(3) Evaluation of Rain-Streak Stain Resistance

The rain-streak stain resistance was evaluated as follows.

Each of the coated metal sheets made in Examples and Comparative Examples was attached to a vertical exposure board. Above the coated metal sheet, a corrugated sheet was further attached at an angle of 20° relative to the ground. Upon this, the corrugated sheet was installed such that rainwater ran down the surface of the coated metal sheet as streaks. In this state, an outdoor exposure test was carried out for 6 months, and the state of stain adhesion was then observed. The rain-streak stain resistance was evaluated using brightness difference (ΔL) of the coated metal sheet before and after the exposure as follows.

D: ΔL was 2 or more (stains were noticeable)

C: ΔL was 1 or more and less than 2 (rain-streak stains were not noticeable, but visible)

B: ΔL was less than 1 (rain-streak stains were hardly visible)

A: ΔL was less than 1 and no rain-streak stain was visible

Note that C, B and A were evaluated as passing.

TABLE 9

| | No. | Hydrophilizing agent Type | Symbol | Amount added (wt %) | Surface treatment method | Si (atm %) | x (O/C) (atm %) | y | Methylene iodide sliding angle | Evaluation of rain-streak stain resistance |
|---|---|---|---|---|---|---|---|---|---|---|
| Examples | 17 | Methyl-based silicone resin | U | 1.5 | Flame | 10.0 | 0.85 | 0.96 | 34 | C |
| | 18 | | U | 3.0 | Flame | 16.9 | 1.40 | 0.90 | 24 | A |
| | 19 | | U | 5.0 | Flame | 25.0 | 2.77 | 0.84 | 24 | A |
| | 20 | | U | 9.0 | Flame | 28.9 | 3.30 | 0.79 | 21 | A |
| | 21 | | V | 5.0 | Flame | 24.7 | 2.44 | 0.66 | 21 | A |
| | 22 | Methyl/phenyl-based silicone resin | W | 1.5 | Flame | 8.5 | 0.90 | 0.89 | 34 | C |
| | 23 | | W | 3.0 | Flame | 15.5 | 1.45 | 0.77 | 26 | A |

TABLE 9-continued

| | | Hydrophilizing agent | | | | Results of XPS analysis | | | Physical properties of coating film | |
| --- | --- | --- | --- | --- | --- | --- | --- | --- | --- | --- |
| No. | | Type | Symbol | Amount added (wt %) | Surface treatment method | Si (atm %) | x (O/C) (atm %) | y | Methylene iodide sliding angle | Evaluation of rain-streak stain resistance |
| | 24 | | W | 5.0 | Flame | 24.5 | 3.11 | 0.79 | 19 | A |
| | 25 | | W | 9.0 | Flame | 27.0 | 3.33 | 0.82 | 25 | A |
| | 26 | | X | 5.0 | Flame | 22.4 | 2.20 | 0.66 | 22 | A |
| Comparative | 13 | Methyl-based silicone | U | 0.8 | Flame | 7.5 | 0.70 | 0.96 | 40 | D |
| Examples | 14 | resin | U | 5.0 | Untreated | 25.0 | 0.55 | 0.24 | 38 | D |
| | 15 | | V | 5.0 | Untreated | 20.0 | 0.62 | 0.22 | 36 | D |
| | 16 | Methyl/phenyl-based | W | 1.0 | Flame | 7.2 | 0.73 | 0.90 | 39 | D |
| | 17 | silicone resin | W | 5.0 | Untreated | 18.5 | 0.56 | 0.23 | 46 | D |
| | 18 | | X | 5.0 | Untreated | 17.7 | 0.44 | 0.24 | 46 | D |
| | 19 | Methyl silicate | Y | 5.0 | Untreated | 7.7 | 0.55 | 0.48 | 13 | D |
| | 20 | Ethyl silicate | Z | 5.0 | Untreated | 9.6 | 0.63 | 0.44 | 14 | D |
| | 21 | Methyl silicate | Y | 5.0 | Flame | 8.8 | 0.66 | 0.77 | 37 | D |
| | 22 | Ethyl silicate | Z | 5.0 | Flame | 8.8 | 0.72 | 0.90 | 39 | D |

As shown in above-described Table 9, when $Si_a$ is 8.0 atm % or more and above-described x is 0.8 or more, and furthermore, y is 0.6 or more, all of the results of rain-streak stain resistance were then satisfactory (Examples 17 to 26). In contrast, when the proportion of Si atoms, $Si_a$, is less than 8.0 atm %, the rain-streak stain resistance was low (Comparative Examples 13, 16 and 19). It is assumed that a sufficient amount of Si atoms were not contained in the surface of the coating film, and therefore, the amount of siloxane bonds or silanol groups in the surface of the coating film was unlikely to be increased sufficiently and it was difficult to enhance hydrophilicity.

In contrast, even when the proportion of Si atoms, $Si_a$, is 8.0 atm % or more, the rain-streak stain resistance was bad as well if x is less than 0.8 or y is less than 0.6 (Comparative Examples 14, 15, 17, 18, and 20 to 22). When x is less than 0.8 or y is less than 0.6, it is believed that organic groups derived from the silicone resin or organic groups derived from organosilicate were not desorbed sufficiently, and it is assumed that a large amount of organic groups were left on the surface and therefore hydrophilicity was not enhanced sufficiently.

The present application claims priority based on Japanese Patent Application No. 2018-188120 filed on Oct. 3, 2018, the entire contents of which including the specification and the accompanying drawings are incorporated herein by reference.

INDUSTRIAL APPLICABILITY

According to the method for producing a coated metal sheet of the present invention, it is possible to readily produce a coated metal sheet having high rain-streak stain resistance and satisfactory appearance without fouling a heating apparatus. Therefore, that method for producing a coated metal sheet, as well as a coated metal sheet to be obtained by that method, is applicable to exterior building materials for various buildings.

REFERENCE SIGNS LIST

22 Burner head
22a Housing
22b Burner port
22c Auxiliary burner port
23 Gas supply pipe

The invention claimed is:

1. A coated metal sheet, comprising: a metal sheet; and a fluorinated coating film formed on the metal sheet, wherein the coating film contains a cured product of a silicone resin, and a fluorine-containing resin;
an amount of the cured product of the silicone resin is 1 to 10 parts by mass of a total mass of the coating film;
the silicone resin contains Si atoms derived from trialkoxysilane in an amount of 50 to 100 mol % relative to the total number of moles of Si atoms;
a weight average molecular weight of the silicone resin is 1000 to 10000;
when a surface of the coating film is analyzed with X-ray electron spectroscopy using an AlKα ray as an X-ray source, $Si_a$ and x satisfy the following expressions respectively, wherein $Si_a$ is a proportion of Si atoms based on a total amount of Si atoms, F atoms, C atoms, and O atoms, and x is a ratio of an amount of O atoms to an amount of C atoms:

$Si_a \geq 8$ atm %

$x \geq 0.8$; and when a C1s peak top in an X-ray photoelectron spectroscopic spectrum obtained through the analysis with X-ray electron spectroscopy is corrected to be 285 eV and a $Si_{2p}$ spectrum is separated into a peak corresponding to 103.5 eV and a peak corresponding to 102.7 eV, y satisfies the following expression, wherein y is a ratio of a peak area of 103.5 eV to a peak area of the entire $Si_{2p}$ spectrum:

$y \geq 0.6$.

2. The coated metal sheet according to claim 1, wherein a methylene iodide sliding angle on the surface of the coating film is 15° or more and 50° or less.

3. The coated metal sheet according to claim 1, wherein the cured product of a silicone resin comprises a structure derived from methyltrialkoxysilane or phenyltrialkoxysilane.

4. The coated metal sheet according to claim 1, wherein the metal sheet is a zinc-based plated steel sheet.

5. A method for producing the coated metal sheet according to claim 1, comprising:
forming a coating film on a surface of a metal sheet by applying and curing a coating material containing a silicone resin and a fluorine-containing resin; and subjecting the coating film to a flame treatment,
wherein the silicone resin contains silanol groups in an amount of 5 to 50 mol % relative to a total number of moles of Si atoms.

6. The method for producing a coated metal sheet according to claim 5, wherein the silicone resin contains Si atoms derived from trialkoxysilane in an amount of 50 to 100 mol % relative to the total number of moles of Si atoms.

7. The method for producing a coated metal sheet according to claim 5, wherein a proportion of a number of moles of aryl groups directly bonded to Si atoms based on a number of moles of alkyl groups directly bonded to Si atoms is 20 to 80% in the silicone resin.

* * * * *